US008033805B2

(12) United States Patent
Gubanich et al.

(10) Patent No.: US 8,033,805 B2
(45) Date of Patent: Oct. 11, 2011

(54) METHOD AND APPARATUS FOR CROSS-PASSAGEWAY PRESSING TO PRODUCE CUTTING INSERTS

(75) Inventors: Richard J. Gubanich, Delmont, PA (US); Daniel Joseph Meharey, Ligonier, PA (US); Edward M. Dinco, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 138 days.

(21) Appl. No.: 12/638,033

(22) Filed: Dec. 15, 2009

(65) Prior Publication Data

US 2010/0159051 A1 Jun. 24, 2010

Related U.S. Application Data

(63) Continuation-in-part of application No. 11/945,647, filed on Nov. 27, 2007.

(51) Int. Cl.
*B29C 43/04* (2006.01)

(52) U.S. Cl. ....... 425/78; 425/330; 425/348 S; 425/441; 100/232

(58) Field of Classification Search .................... 425/78, 425/330, 352, 356, 441, 348 S, DIG. 58; 100/232
See application file for complete search history.

(56) References Cited

U.S. PATENT DOCUMENTS 1,286,089 A 11/1918 Pfanstiehl
1,648,721 A 11/1927 Claus
2,089,030 A 8/1937 Kratky
2,195,297 A 3/1940 Engle
2,289,787 A 7/1942 Kaschke et al.
2,558,823 A 7/1951 Crowley et al.
2,667,650 A 2/1954 Friedman
2,751,293 A 6/1956 Haller
2,791,804 A 5/1957 Talmage
2,800,684 A 7/1957 Luthman
3,020,589 A 2/1962 Maritano
3,346,914 A 10/1967 Sandstrom et al.
3,399,557 A * 9/1968 Lang et al. ...................... 72/258
3,555,607 A 1/1971 Epain et al.
3,719,479 A 3/1973 Flanagan
3,720,491 A * 3/1973 Dedek ............................ 425/78

(Continued)

FOREIGN PATENT DOCUMENTS

DE 43 36 744 5/1995

(Continued)

OTHER PUBLICATIONS

Dorst Technologies, TPA HS Pressing forces from of 150 to 1.200 kN, May 2006.

(Continued)

*Primary Examiner* — Richard Crispino
*Assistant Examiner* — Thukhanh Nguyen
(74) *Attorney, Agent, or Firm* — Larry R. Meenan

(57) ABSTRACT

A die for use with a uni-axial press including top and bottom rams, at least one of the top and bottom rams being movable along a pressing axis. The die includes at least two separable die parts mutually engageable along adjacent parting surfaces extending in a direction non-perpendicular to the pressing axis and a removable core rod. The die parts are movable between separated and engaged positions in a direction non-parallel to the pressing axis. The die includes a first passageway extending therethrough between the periphery of the die and the die chamber. The first removable core rod is configured to be inserted into the die chamber through the first passageway.

26 Claims, 22 Drawing Sheets

U.S. PATENT DOCUMENTS

| | | | |
|---|---|---|---|
| 3,737,502 | A | 6/1973 | Rees |
| 3,752,622 | A | 8/1973 | Viadana |
| 3,753,641 | A | 8/1973 | Turner et al. |
| 3,758,245 | A | 9/1973 | Hermes |
| 3,909,167 | A | 9/1975 | Signora |
| 3,972,662 | A | 8/1976 | Bird |
| 3,996,048 | A | 12/1976 | Fiedler |
| 4,274,276 | A | 6/1981 | Mettler |
| 4,337,025 | A | 6/1982 | Pagels et al. |
| 4,340,350 | A | 7/1982 | Springborn |
| 4,439,129 | A | 3/1984 | Long et al. |
| 4,655,984 | A | 4/1987 | Hinton et al. |
| 4,923,672 | A | 5/1990 | Gladden et al. |
| 5,007,814 | A | 4/1991 | Saunders et al. |
| 5,032,050 | A | 7/1991 | Niebauer et al. |
| 5,039,292 | A | 8/1991 | Tanigawa et al. |
| 5,043,123 | A | 8/1991 | Gormanns et al. |
| 5,227,576 | A | 7/1993 | Howard |
| 5,273,710 | A | 12/1993 | Zengin |
| 5,364,253 | A | 11/1994 | Kojima et al. |
| 5,378,416 | A | 1/1995 | Kishi et al. |
| 5,382,405 | A | 1/1995 | Lowrance, II et al. |
| 5,393,486 | A | 2/1995 | Eckert et al. |
| 5,403,373 | A | 4/1995 | Kitagawa et al. |
| 5,476,631 | A | 12/1995 | Brown et al. |
| 5,498,147 | A | 3/1996 | Katagiri et al. |
| 5,503,795 | A | 4/1996 | Hubbard |
| 5,698,149 | A | 12/1997 | Hinzmann et al. |
| 5,701,574 | A | 12/1997 | Derflinger et al. |
| 5,710,969 | A | 1/1998 | Newman |
| 5,725,816 | A | 3/1998 | Sagawa et al. |
| 5,727,910 | A | 3/1998 | Leeb |
| 5,772,748 | A | 6/1998 | Hubbard |
| 5,792,403 | A | 8/1998 | Massa et al. |
| 5,812,924 | A | 9/1998 | Shaffer et al. |
| 5,925,303 | A | 7/1999 | Scheliga |
| 5,933,700 | A | 8/1999 | Tilton |
| 6,004,120 | A | 12/1999 | Matsubara et al. |
| 6,010,283 | A | 1/2000 | Henrich et al. |
| 6,080,358 | A | 6/2000 | Oba et al. |
| 6,099,772 | A | 8/2000 | Hinzmann et al. |
| 6,113,378 | A | 9/2000 | Tsuboi et al. |
| 6,116,890 | A | 9/2000 | Sors |
| 6,120,728 | A | 9/2000 | Hinzmann et al. |
| 6,165,400 | A | 12/2000 | Hinzmann |
| 6,318,986 | B1 | 11/2001 | Hinzmann et al. |
| 6,375,880 | B1 | 4/2002 | Cooper et al. |
| 6,440,357 | B1 | 8/2002 | Hinzmann |
| 6,503,028 | B1 | 1/2003 | Wallstrom |
| 6,645,426 | B1 | 11/2003 | Yoshihara et al. |
| 6,766,660 | B2 | 7/2004 | Tojo et al. |
| 6,804,876 | B1 * | 10/2004 | Ito et al. ........................ 29/602.1 |
| 6,860,172 | B2 | 3/2005 | Hecht |
| 6,986,866 | B2 | 1/2006 | Gubanich et al. |
| 7,207,103 | B2 * | 4/2007 | Poltorak .......................... 29/729 |
| 7,829,015 | B2 * | 11/2010 | Kuplen et al. ................... 425/78 |
| 2002/0011690 | A1 | 1/2002 | Tojo et al. |
| 2002/0122738 | A1 | 9/2002 | Van Daam et al. |
| 2004/0035269 | A1 | 2/2004 | Hecht |
| 2004/0086415 | A1 | 5/2004 | Gubanich |
| 2005/0269729 | A1 | 12/2005 | Holthausen et al. |
| 2006/0024191 | A1 | 2/2006 | Gubanich et al. |
| 2006/0165828 | A1 | 7/2006 | Smilovici et al. |
| 2008/0020082 | A1 | 1/2008 | Plucinski et al. |
| 2008/0196604 | A1 | 8/2008 | Menzel et al. |
| 2009/0136776 | A1 | 5/2009 | Gubanich et al. |

FOREIGN PATENT DOCUMENTS

| | | |
|---|---|---|
| DE | 19508952 | 9/1996 |
| EP | 0718473 | 6/1996 |
| EP | 1 228 827 | 8/2002 |
| EP | 1 852 247 | 11/2007 |
| EP | 1 952 975 | 8/2008 |
| EP | 2 098 317 | 9/2009 |
| EP | 2 103 423 | 9/2009 |
| FR | 2 095 120 | 2/1972 |
| FR | 2863187 | 6/2005 |
| GB | 1 398 611 | 6/1975 |
| GB | 2 012 654 | 12/1978 |
| GB | 2271526 | 4/1994 |
| GB | 2 329 863 | 4/2007 |
| JP | 55 088945 | 5/1980 |
| JP | 59 197503 | 11/1984 |
| JP | 63-036998 | 2/1988 |
| JP | 63-168296 | 7/1988 |
| JP | 6246497 | 9/1994 |
| JP | 07-040096 | 2/1995 |
| JP | 7040095 | 2/1995 |
| JP | 7088698 | 4/1995 |
| JP | 7 124792 | 5/1995 |
| JP | 7148597 | 6/1995 |
| JP | 8340666 | 12/1996 |
| JP | 10 071497 | 3/1998 |
| JP | 10-118796 | 5/1998 |
| JP | 10128595 | 5/1998 |
| JP | 10146695 | 6/1998 |
| JP | 10296499 | 11/1998 |
| JP | 11 300497 | 11/1999 |
| JP | 2000 71099 | 3/2000 |
| JP | 2000-135598 | 5/2000 |
| JP | 2000-237899 | 6/2000 |
| JP | 2000 303104 | 10/2000 |
| JP | 2001 89802 | 4/2001 |
| JP | 2001 232499 | 8/2001 |
| JP | 2001256899 | 9/2001 |
| JP | 2002 18599 | 1/2002 |
| JP | 2003 193106 | 7/2003 |
| JP | 2005-177836 | 7/2005 |
| JP | 2005177835 | 7/2005 |
| WO | WO 9408743 | 4/1994 |
| WO | WO 98/29211 | 7/1998 |
| WO | WO 99/58738 | 11/1999 |
| WO | WO 01/05541 | 1/2001 |
| WO | WO 01/74519 | 10/2001 |
| WO | WO 2004/041463 | 5/2004 |
| WO | WO 2006/080002 | 8/2006 |
| WO | WO 2007/019832 | 2/2007 |
| WO | WO 2009/115444 | 9/2009 |

OTHER PUBLICATIONS

Dorst Technologies, New Ways—New Quality, side Compacting—a new Dimension, May 2006.

JAN Entwicklung Brochure (2 pages), Dec. 2006.

* cited by examiner

METHOD AND APPARATUS FOR CROSS-PASSAGEWAY PRESSING TO PRODUCE CUTTING INSERTS

CROSS-REFERENCE TO RELATED APPLICATIONS

This application is a continuation-in-part of U.S. application Ser. No. 11/945,647, filed on Nov. 27, 2007, currently pending, which is hereby incorporated by reference in its entirety.

BACKGROUND OF THE INVENTION

1. Field of the Invention

The present invention relates to a uni-axial press for use in metallurgical processes for the consolidation of powder to form a green part, which includes a split case die apparatus and various removable rods to impart features to the green part.

2. Description of Related Art

Fabrication of cutting inserts from sinterable powder, i.e. cemented carbide metallurgical cermets or ceramic powders, involves compaction of the sinterable powder with or without a fugitive binder into a pre-sintered green part. Subsequent sintering of the green part produces a finished part which may be a cutting tool. Compaction takes place in a powder press under high pressure obtained through large opposing forces generated by top and bottom rams urged into a die cavity formed in a die containing the sinterable powder.

Compaction of the powders to form a green part may be undertaken utilizing a wide variety of techniques. Typically, a die chamber, provided within a die, is filled with powder to be compressed. One or two opposing rams moving through the die and into the die chamber along a pressing axis compress the powder and forms a green part within the die chamber. The compressed green part is then removed from the die chamber. In some instances, the green part may be provided with certain features during compaction by imparting the sides of the die chamber with facets and protrusions extending into the die chamber or by inserting a removable rod into the die chamber during compaction to form a mounting passageway within the green part. The variety and usefulness of these techniques for providing features to the green part during compaction has been heretofore limited.

SUMMARY OF THE INVENTION

The present invention provides for a uni-axial press that includes a split case die arrangement of two or more separable die parts, which collectively define a die chamber for the compaction of powder to form a green part. The press also includes top and bottom rams that extend into the die chamber and provide compaction of the powder. The surfaces of the die chamber and the ends of the rams may be provided with various shaped impressions to form corresponding impressions or bores of varying shapes and size within the compacted green part. One or more removable rods of varying configurations may also be inserted into the die chamber via passageways formed in the die parts to create corresponding bores and recesses within the compacted green part. According the embodiments of the present invention, a wide variety of features, such as curved channels, mounting passageways, coolant channels, heat sinks, protrusions, and chip-breaking surfaces may be formed in the green part during compaction without requiring further machining of the green part prior to sintering.

According to an embodiment of the present invention, a die for use with a uni-axial press including top and bottom rams, at least one of the top and bottom rams being movable along a pressing axis, is provided. The die includes at least two separable die parts, each having: a top surface and a bottom surface, the top and bottom surfaces of the separable die parts collectively defining top and bottom surfaces of the die; a peripheral surface, the peripheral surfaces of the separable die parts collectively defining a periphery of the die; parting surfaces extending between the top and bottom surfaces of the die part in a direction non-perpendicular to the pressing axis, the die parts being mutually engageable along adjacent parting surfaces; a die chamber portion, the die chamber portions of the separable die parts collectively defining a die chamber extending along the pressing axis; and top and bottom pressing bore portions extending between the die chamber portion and the top and bottom surfaces, respectively, the top and bottom pressing bore portions of the separable die parts collectively defining top and bottom pressing bores extending from the die chamber to the top and bottom surfaces of the die, respectively. The die also includes a first removable core rod. The die parts are movable between separated and engaged positions in a direction non-parallel to the pressing axis. The die includes a first passageway extending therethrough between the periphery of the die and the die chamber, and the first removable core rod is configured to be inserted into the die chamber through the first passageway.

According to a further embodiment of the present invention, a uni-axial press for forming a compressed part from powder is provided. The uni-axial press includes a top ram and a bottom ram movable relative to one another along a pressing axis; and at least two separable die parts, each having: a top surface and a bottom surface, the top and bottom surfaces of the separable die parts collectively defining top and bottom surfaces of the die; a peripheral surface, the peripheral surfaces of the separable die parts collectively defining a periphery of the die; parting surfaces extending between the top and bottom surfaces of the die part in a direction non-perpendicular to the pressing axis, the die parts being mutually engageable along adjacent parting surfaces; a die chamber portion, the die chamber portions of the separable die parts collectively defining a die chamber extending along the pressing axis; and top and bottom pressing bore portions extending between the die chamber portion and the top and bottom surfaces, respectively, the top and bottom pressing bore portions of the separable die parts collectively defining top and bottom pressing bores extending from the die chamber to the top and bottom surfaces of the die, respectively. The die parts are movable between separated and engaged positions in a direction non-parallel to the pressing axis and the top and bottom rams are movable through the top and bottom pressing bores, respectively, into the die chamber. At least one of the top and bottom rams includes a shaped impression at an end thereof and the end having the shaped impression is configured to be inserted into the die chamber through the respective pressing bore.

Further details and advantages of the invention will become clear upon reading the following detailed description in conjunction with the accompanying drawing figures, wherein like parts are designated with like reference numerals throughout.

DESCRIPTION OF PREFERRED EMBODIMENTS

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Figure 1:
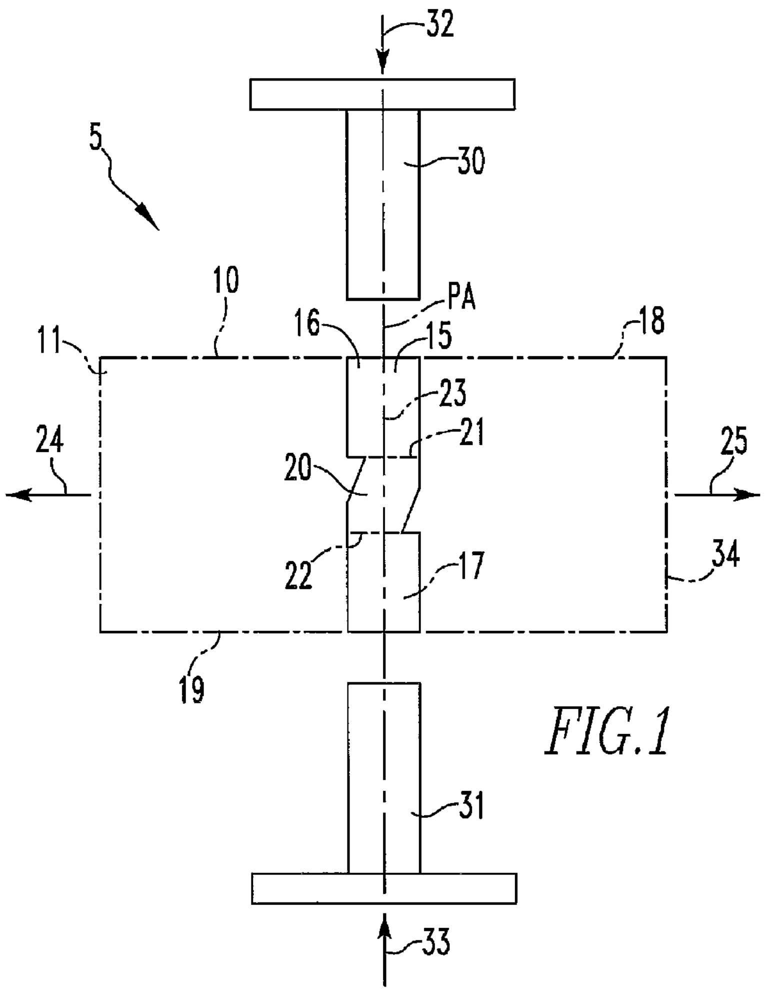
FIG. 1 is a schematic illustrating a split case die with top and bottom rams which act in concert with the split case die.
Figure 2:
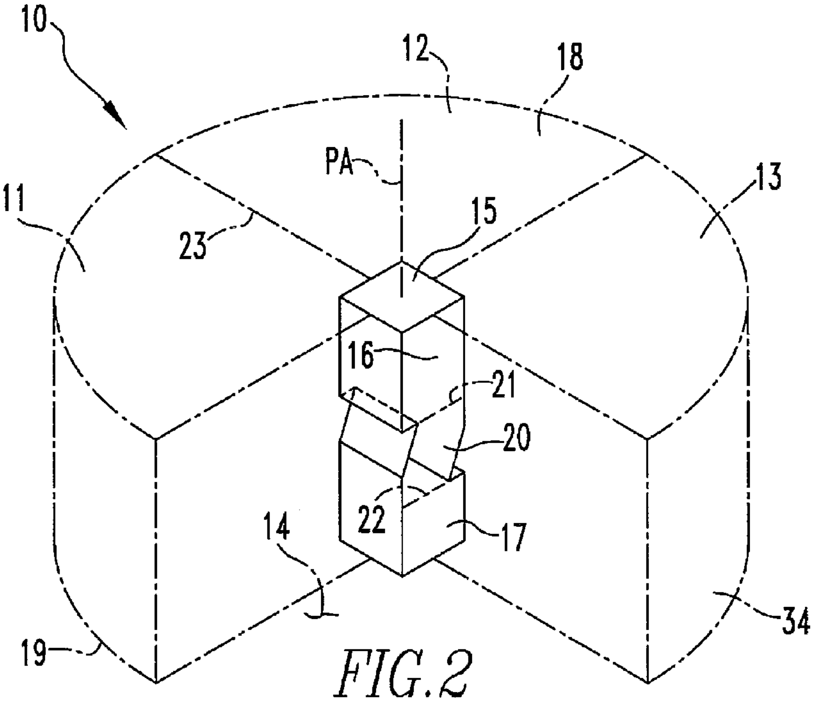
FIG. 2 is a perspective view of a split case die in the assembled state.

Referring to FIGS. 1 and 2, a uni-axial press 5 that includes a split case die 10 with top 30 and bottom 31 rams, which act in concert with the split case die 10 to form a compressed part from powder, such as metallurgical powder, is shown. The die 10 includes four separable die parts 11, 12, 13, 14 that are movable between separated and engaged positions in a direction non-parallel to a pressing axis PA of the die 10. The position occupied by the fourth die part 14 is indicated in FIG. 2, though the fourth die part 14 is not shown for purposes of illustrating the internal features of the die 10.

The die 10 has a die cavity 15 made up of a die chamber 20 in which the compressed green part is formed. A first pressing bore 16 is in the die cavity 15 on one side of the die chamber 20, while a second pressing bore 17 is in the die cavity 15 on the opposite side of the die chamber 20. The top ram 30 is moveable within the first pressing bore 16 along arrow 32, while a bottom ram 31 is moveable within the second pressing bore 17 along arrow 33. Each ram 30, 31 is moveable to a compressed position at respective edges 21, 22 of the die chamber 20. With the top ram 30 and the bottom ram 31 extended into the respective pressing bores 16, 17 the die chamber 20 has a configuration essentially identical to the configuration of the green part. It is also possible in forming the compressed green part for one of the top ram 30 or the bottom ram 31 to remain stationary while the other ram moves toward the stationary ram.

It should be noted, however, with respect to FIGS. 1 and 2, that once the green part is formed within the die chamber 20, the green part is essentially captured within the die chamber 20 and cannot be removed without opening the die 10, even with the top ram 30 and the bottom ram 31 fully withdrawn. However, in accordance with the subject invention, the die 10 is a split case die such that, for example, die part 11 is separate and distinct from die part 12. The die 10 is able to be opened because the die parts 11, 12 are separable. For purposes of this explanation, the die parts 11, 12 are separated along a parting line 23 aligned with the pressing axis PA. As a result, the die part 11 may be separated from the die part 12 in, for example, the direction of arrows 24, 25, to provide clearance for the green part to be removed from the die 10.

While parting line 23 is illustrated as a straight line, the line may also have a non-straight configuration, depending upon the shape of the desired part and the desire to separate the die parts without damaging the corresponding green part.

With further reference to FIGS. 1 and 2, when in the engaged position, the die parts 11, 12, 13, 14 collectively define the die cavity 15, the first 16 and second 17 pressing bores, the top 18 and bottom 19 surfaces of the die 10, the die chamber 20, and a periphery 34 of the die 10.

The specific techniques and specific hardware used to compress a green part via the use of a split case die are discussed thoroughly in U.S. application Ser. No. 11/945,647, which is assigned to the Assignee of the present application and which is hereby incorporated by reference in its entirety. It is to be appreciated that the uni-axial presses and split case dies discussed below in accordance with several embodiments of the present invention may be built and operated according to the descriptions provided in the above-referenced application or according to other techniques and arrangements known to those having ordinary skill in the art.

The several embodiments of the present invention discussed below also involve cross-passageway pressing of the green part using a removable core rod passing through one or more die parts from a periphery of the die and into the die chamber for imparting to a green part, a recess or cross-passageway extending into or through the green part in a direction nonparallel to the pressing axis. Certain techniques and hardware used to form a cross-passageway in a green part via a split case die apparatus with a removable core rod are discussed in U.S. application Ser. No. 11/945,647. The specific techniques and specific hardware for forming a cross-passageway in a green part utilizing a solid unified die and removable core rod are discussed in U.S. application Ser. No. 10/287,430 (now U.S. Pat. No. 6,986,866) which is assigned to the Assignee of the present application and which is hereby incorporated by reference in its entirety. It is to be appreciated that the uni-axial presses and removable core rods discussed below in accordance with several embodiments of the present invention may be built and operated according to the descriptions provided in both of the above-referenced applications or according to other techniques and arrangements known to those having ordinary skill in the art.

Figure 3A:
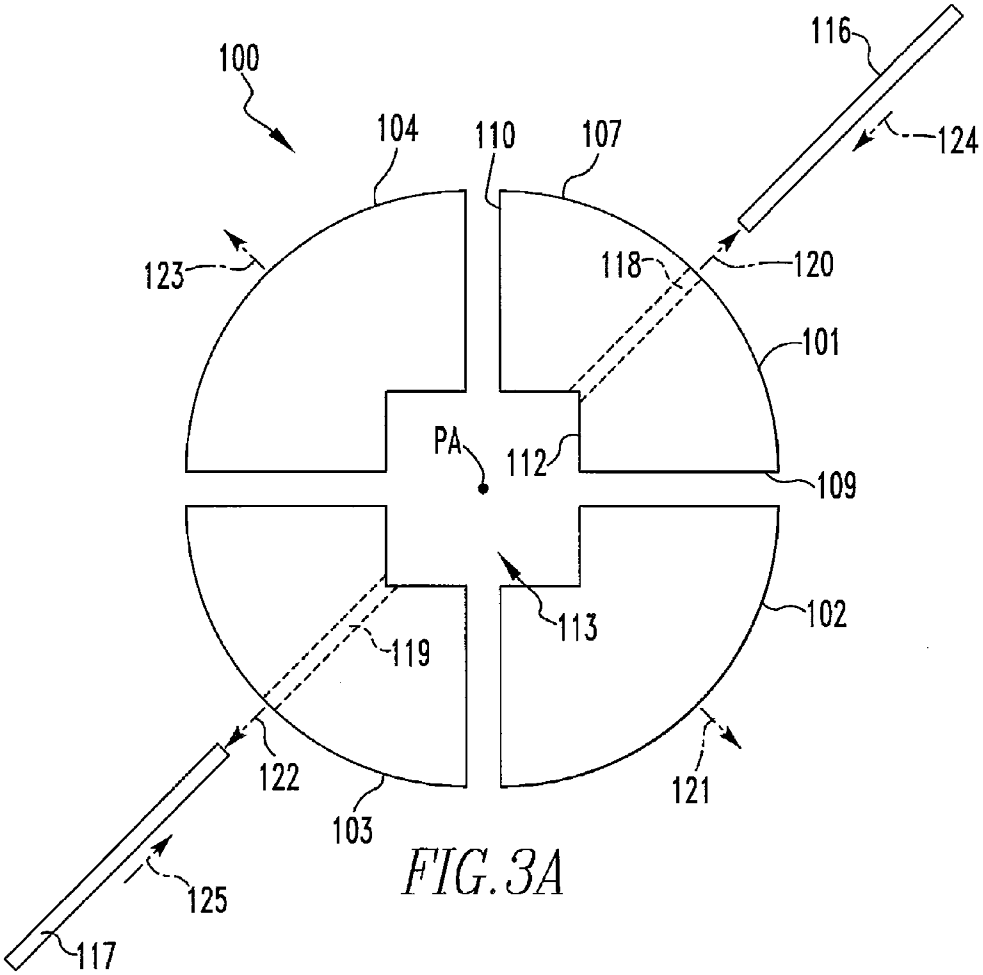
FIG. 3A is a top plan view of a split case die and removable core rods in the separated state according to an embodiment of the present invention.
Figure 3B:
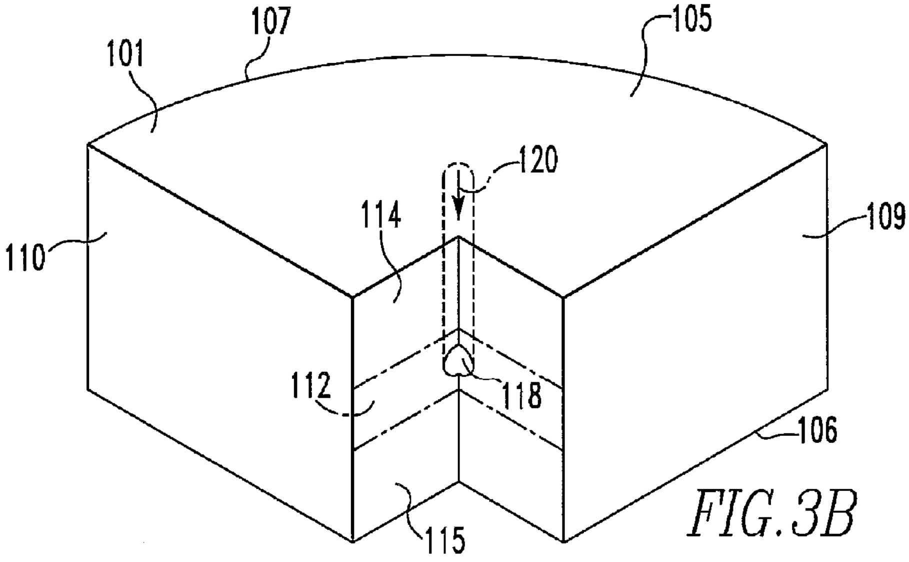
FIG. 3B is a perspective view of a die part of the split case die according to the embodiment shown in FIG. 3A.
Figure 3C:
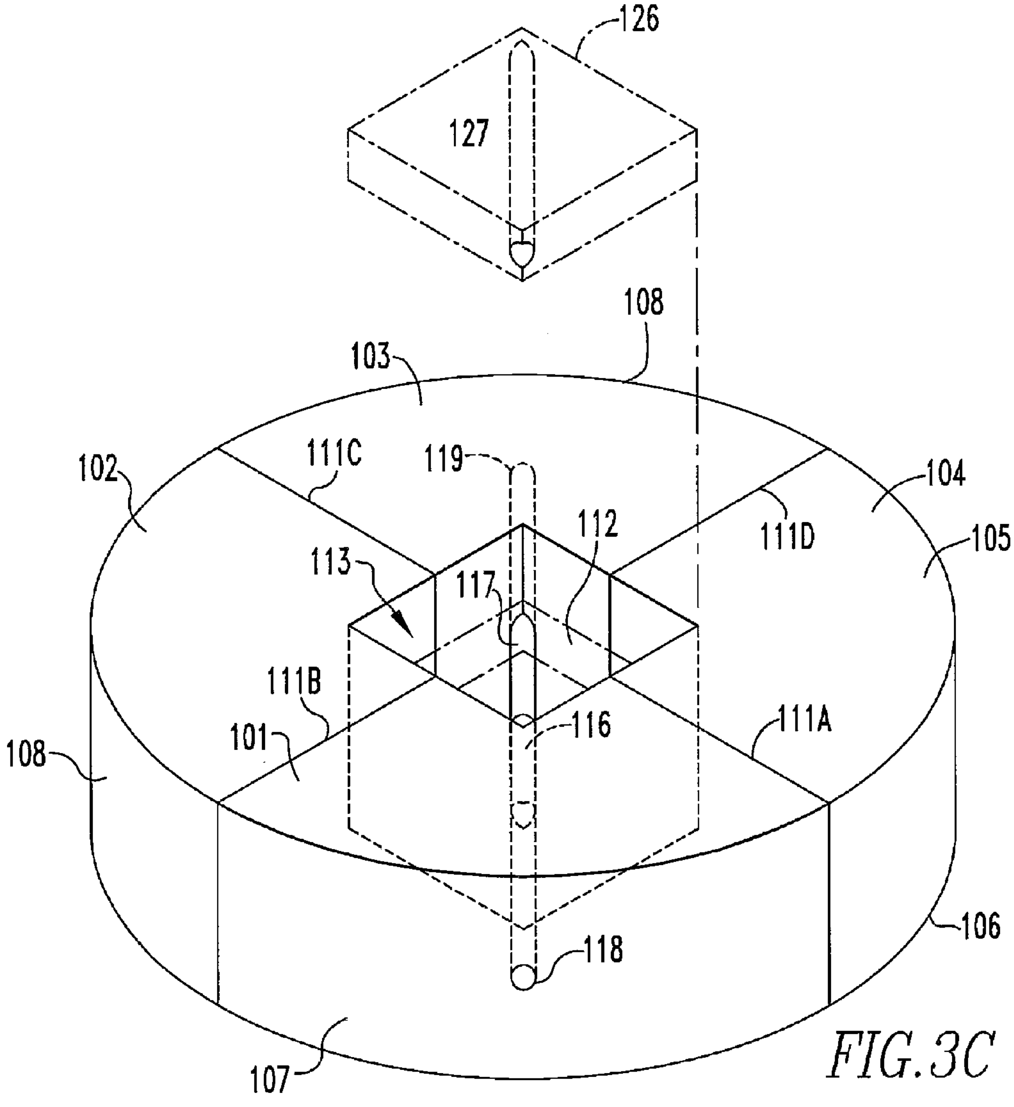
FIG. 3C is a perspective view of the split case die according to the embodiment shown in FIG. 3A in the assembled state.

With reference to FIGS. 3A-3C, a split case die 100 for use with a uni-axial press including top and bottom rams, with at least one of the top and bottom rams being movable along a pressing axis PA, according to an embodiment of the present invention, is shown. The die 100 includes first 101, second 102, third 103, and fourth 104 separable die parts. For purposes of this discussion, unless described otherwise, it will be assumed that all four die parts 101, 102, 103, 104 are identical and fit together as illustrated in FIGS. 3A-3C. Therefore die part 101 will be discussed with the understanding that reference numbers and element names will be the same for all four die parts 101, 102, 103, 104.

As shown in FIG. 3B, the die part 101 includes a top surface 105 and a bottom surface 106, at least one peripheral surface 107, parting surfaces 109, 110 extending between the top 105 and bottom 106 surfaces of the die part 101, 102, 103, 104 in a direction non-perpendicular to the pressing axis PA, a die chamber portion 112 and top 114 and bottom 115 pressing bore portions extending between the die chamber portion 112 and the top 105 and bottom 106 surfaces, respectively.

As shown in FIGS. 3A and 3C, the top 105 and bottom 106 surfaces of all four die parts 101, 102, 103, and 104 collectively define the top and bottom surfaces of the die 100. The peripheral surfaces 107 of all four die parts 101, 102, 103, and 104 collectively define the periphery 108 of the die 100. The die parts 101, 102, 103, 104 are mutually engageable along adjacent parting surfaces 109, 110. The die chamber portions 112 of all four die parts 101, 102, 103 and 104 collectively define a die chamber 113 extending along the pressing axis PA. The top and bottom pressing bore portions 114, 115 of all four die parts 101, 102, 103, 104 collectively define the top and bottom pressing bores. Though illustrated and described as including four separable die parts 101, 102, 103, 104, it is to be appreciated that the die 100, according to the present embodiment, could be provided within only two or more die parts disposed opposite each other.

The die parts 101, 102, 103, 104 are movable between separated (FIG. 3A) and engaged (FIG. 3C) positions in a direction non-parallel to the pressing axis PA, as indicated by the respective arrows 120, 121, 122, 123. The die parts 101, 102, 103, 104 mutually engage along adjacent parting surfaces 109, 110 to form parting lines 111A, 111B, 111C, 111D. The die 100 includes first 118 and second 119 passageways extending through the die 100 between the periphery 108 of the die 100 and the die chamber 113. As shown, the first passageway 118 extends through the first die part 101 between the peripheral surface 107 and the die chamber portion 112 of the die part 101 in a direction non-parallel to the pressing axis PA. The second passageway 119 extends through the third die part 103 in like manner to the first passageway 118. The first 118 and second 119 passageways extend through the respective die parts 101, 103 co-linearly and parallel to each other in a direction non-parallel to the pressing axis PA. As shown in FIG. 3A, the first 118 and second 119 passageways extend through the respective die parts 101, 103 parallel to the direction of movement of the die parts 101, 103 between the separated and engaged positions, as indicated by the respective arrows 120, 122.

The die 100 further includes first 116 and second 117 removable core rods, which are configured to be inserted into the die chamber 113 via the first 118 and second 119 passageways, respectively, as indicated by respective arrows 124, 125. The first 116 and second 117 removable core rods may engage each other within the die chamber 113, as shown in FIG. 3C. It is to be appreciated that the die 100 according to the present embodiment could be provided with a single removable core rod 116 configured to be inserted through both passageways 118, 119 and the die chamber 113.

Figure 3D:
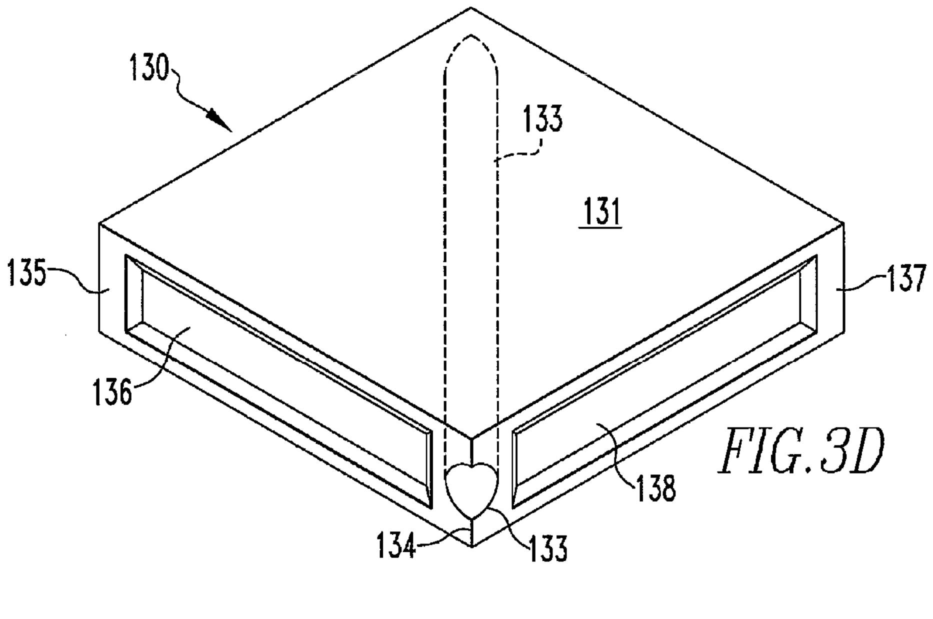
FIG. 3D is a perspective view of a green part formed by the split case die according to the embodiment shown in FIG. 3A.

With further reference to FIG. 3C, the die chamber 113 defines an envelope 126, illustrated by the broken lines above the die 100, which corresponds to the shape of the green part in the compressed state. The first 116 and second 117 removable core rods define an additional envelope 127 within the die chamber envelope 126, which corresponds to the shape of a core bore passing through the compressed green part from corner to corner thereof. As shown in FIG. 3D, a green part 130 formed with the die 100 includes a top surface 131. The green part 130 also has a core bore 133 passing therethrough from corner 134 to opposing corner. Alternatively, the first 118 and second passageways 119 may be eccentrically arranged with the die parts 101, 103 such that the core bore 133 does not pass from corner 134 to corner and does not intersect with the central passageway 132. The green part 130 further includes a plurality of side surfaces 135, 137 that are imparted by the die chamber portions 112 of the die parts 101, 102, 103, 104 with certain respective surface features 136, 138, which may be chip control features in the sintered part that may assist with chip formation during a metal cutting operation. It is to be appreciated that the die parts 101, 102, 103, 104 may be configured to impart a number of different surface features 136, 138 known to those having ordinary skill in the art.

Figure 4A:
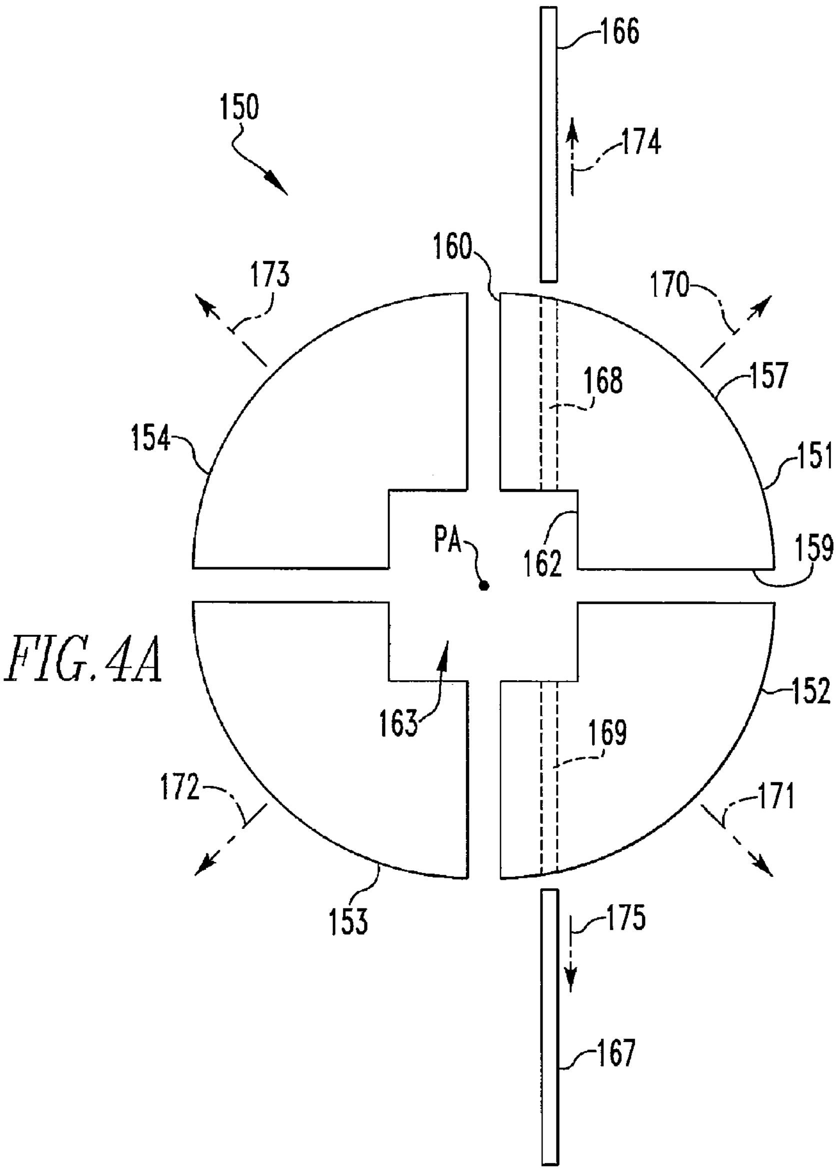
FIG. 4A is a top plan view of a split case die and removable core rods in the separated state according to another embodiment of the present invention.
Figure 4B:
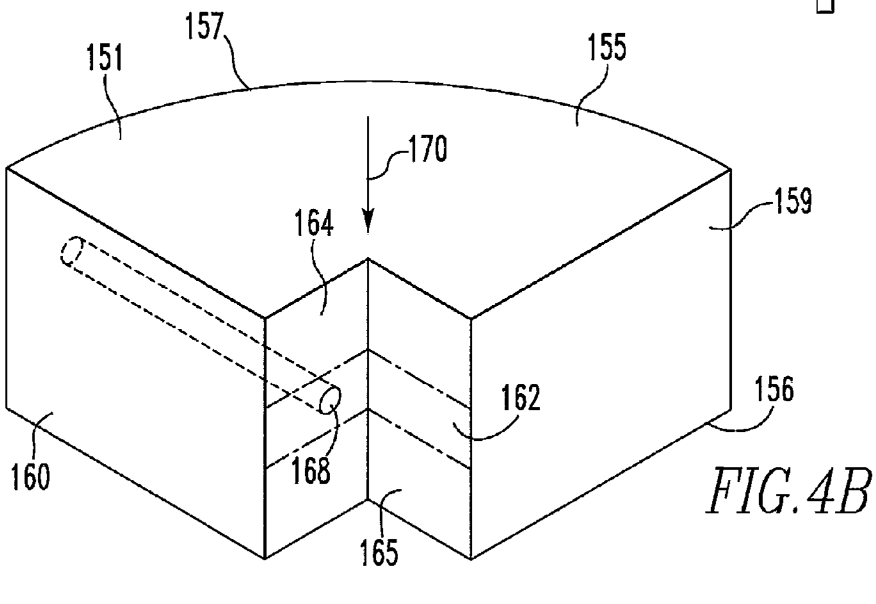
FIG. 4B is a perspective view of a die part of the split case die according to the embodiment shown in FIG. 4A.
Figure 4C:
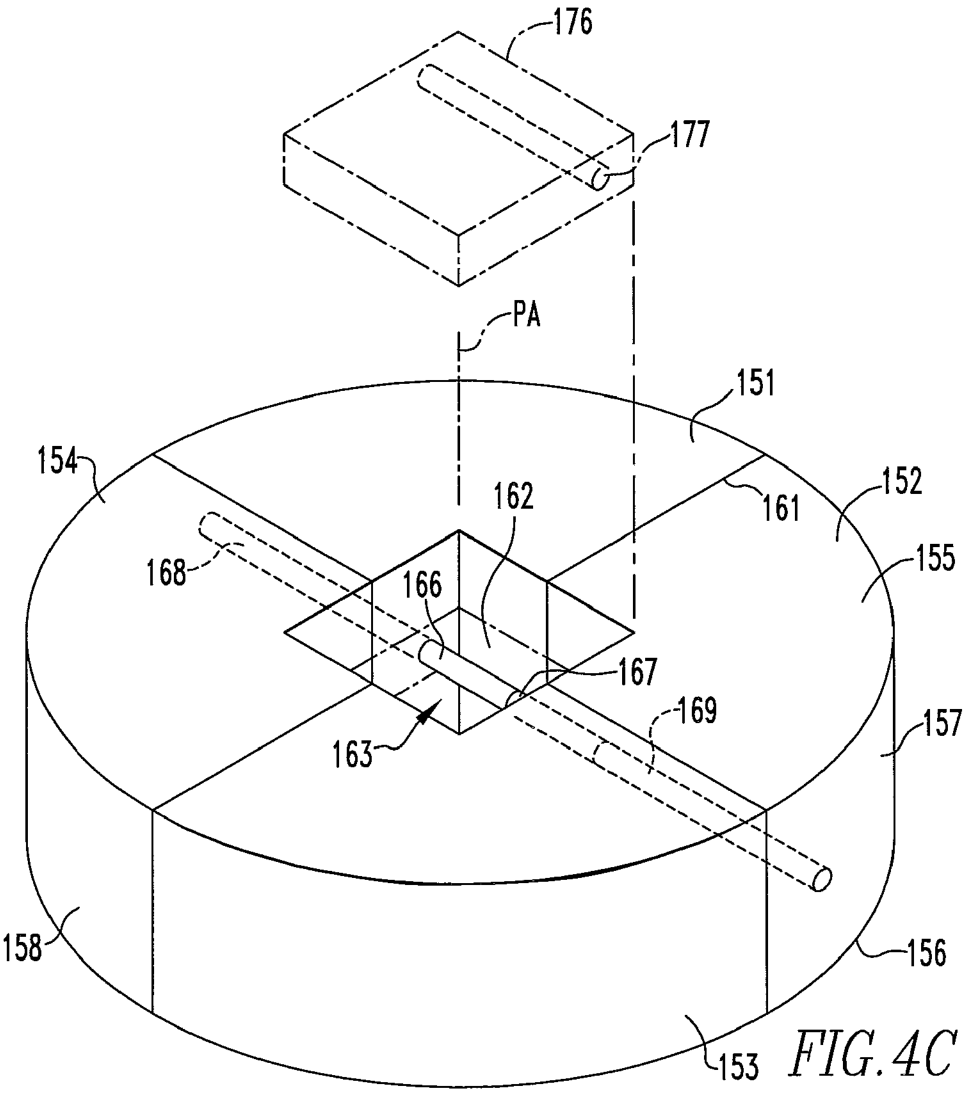
FIG. 4C is a perspective view of the split case die according to the embodiment shown in FIG. 4A in the assembled state.

In accordance with another embodiment of the present invention and with reference to FIGS. 4A-4C, a split case die 150 for use with a uni-axial press including top and bottom rams, with at least one of the top and bottom rams being movable along a pressing axis PA, is shown. The die 150 includes first 151, second 152, third 153, and fourth 154 separable die parts. As shown in FIG. 4B, each die part 151, 152, 153, 154 includes a top surface 155 and a bottom surface 156, at least one peripheral surface 157, parting surfaces 159, 160 extending between the top 155 and bottom 156 surfaces of the die part 151, 152, 153, 154, a die chamber portion 162 and top 164 and bottom 165 pressing bore portions extending between the die chamber portion 162 and the top 155 and bottom 156 surfaces, respectively.

As shown in FIGS. 4A and 4C, the top 155 and bottom 156 surfaces of all four die parts 151, 152, 153, and 154 collectively define the top and bottom surfaces of the die 150. The peripheral surfaces 157 of all four die parts 151, 152, 153, 154 collectively define the periphery 158 of the die 150. The die parts 151, 152, 153, 154 are mutually engageable along each of their adjacent parting surfaces 159, 160. The die chamber portions 162 of all four die parts 151, 152, 153, 154 collectively define the die chamber 163 extending along the pressing axis PA. The top 164 and bottom 165 pressing bore portions of all four die parts 151, 152, 153, 154 collectively define the top and bottom pressing bores. Though illustrated and described as including four separable die parts 151, 152, 153, 154, it is to be appreciated that the die 150, according to the present embodiment, could be provided with two or more die parts disposed opposite each other.

The die parts 151, 152, 153, 154 are movable between separated (FIG. 4A) and engaged (FIG. 4C) positions in a direction non-parallel to the pressing axis PA, as indicated by the respective arrows 170, 171, 172, 173. The die parts 151, 152, 153, 154 mutually engage along each of their adjacent parting surfaces 159, 160 to form a parting line 161. The die 150 includes first 168 and second 169 passageways extending through the die 150 between the periphery 158 of the die 150 and the die chamber 163. As shown, the first passageway 168 extends through the first die part 151 between the peripheral surface 157 and the die chamber portion 162 of the die part 151 in a direction non-parallel to the pressing axis PA along the parting surface 160 of the die part 151. The second passageway 169 extends through the second die part 152 in like manner to the first passageway 168. The first 168 and second 169 passageways extend through the respective die parts 151, 152 co-linear with each other in a direction non-parallel to the pressing axis PA. As shown in FIG. 4A, the first 168 and second 169 passageways extend through the respective die parts 151, 152 non-parallel to the direction of movement of the die parts 151, 152, as indicated by the respective arrows 170, 171, between the separated and engaged positions.

The die 150 further includes first 166 and second 167 removable core rods, which are configured to be inserted into the die chamber 163 via the first 168 and second 169 passageways, respectively, as indicated by respective arrows 174, 175. The first 166 and second 167 removable core rods may engage each other within the die chamber 163, as shown in FIG. 4C. It is to be appreciated that the die 150, according to the present embodiment, could be provided with a single removable core rod 166 configured to be inserted through both passageways 168, 169 and the die chamber 163.

Figure 4D:
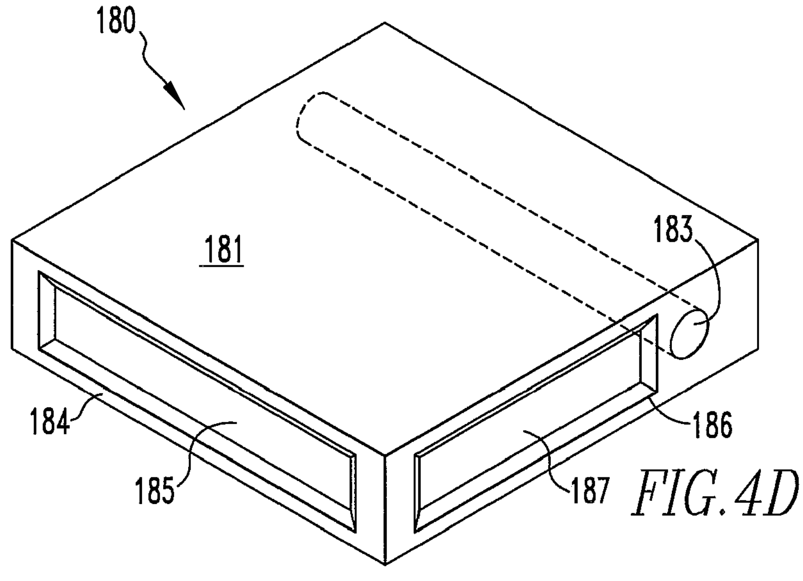
FIG. 4D is a perspective view of a green part formed by the split case die according to the embodiment shown in FIG. 4A.

With further reference to FIG. 4C, the die chamber 163 defines an envelope 176, illustrated by the broken lines above the die 150, which corresponds to the shape of the green part in the compressed state. The first 166 and second 167 removable core rods define an additional envelope 177 within the die chamber envelope 176, which corresponds to the shape of a core bore passing through the compressed green part from side to side thereof. As shown in FIG. 4D, a green part 180 formed with the die 150 includes a top surface 181. The green part 180 further includes a plurality of side surfaces 184, 186 that are imparted by the die chamber portions 162 of the die parts 151, 152, 153, 154 with certain respective surface features 185, 187, which may be chip control features in the sintered part that may assist with chip formation during a metal cutting operation. The green part 180 also has a core bore 183 passing therethrough from side 186 to opposing side. It is to be appreciated that the die parts 151, 152, 153, 154 may be configured to impart a number of different surface features 185, 187 known to those having ordinary skill in the art.

Figure 5A:
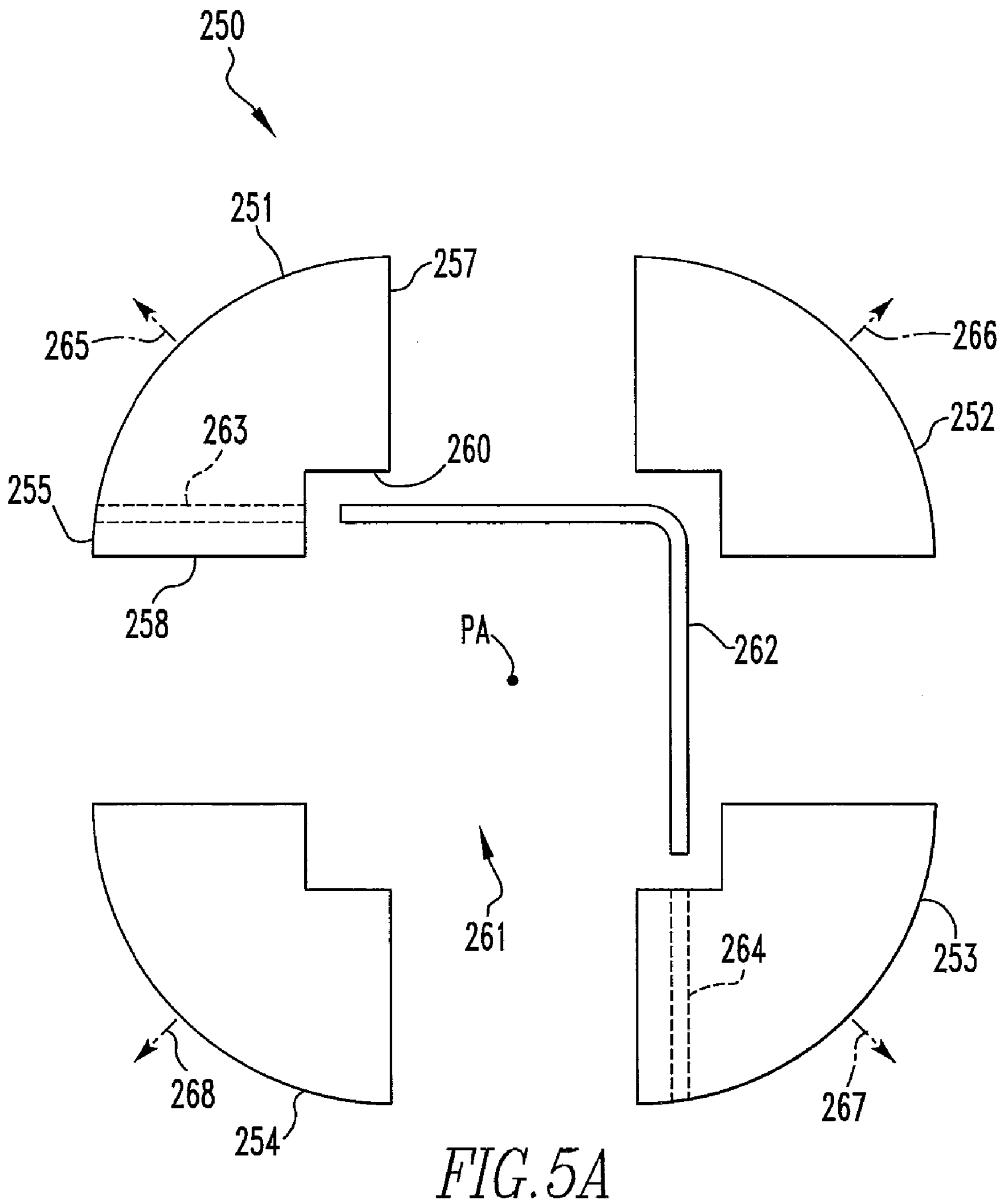
FIG. 5A is a top plan view of a split case die and removable core rod in the separated state according to another embodiment of the present invention.
Figure 5B:
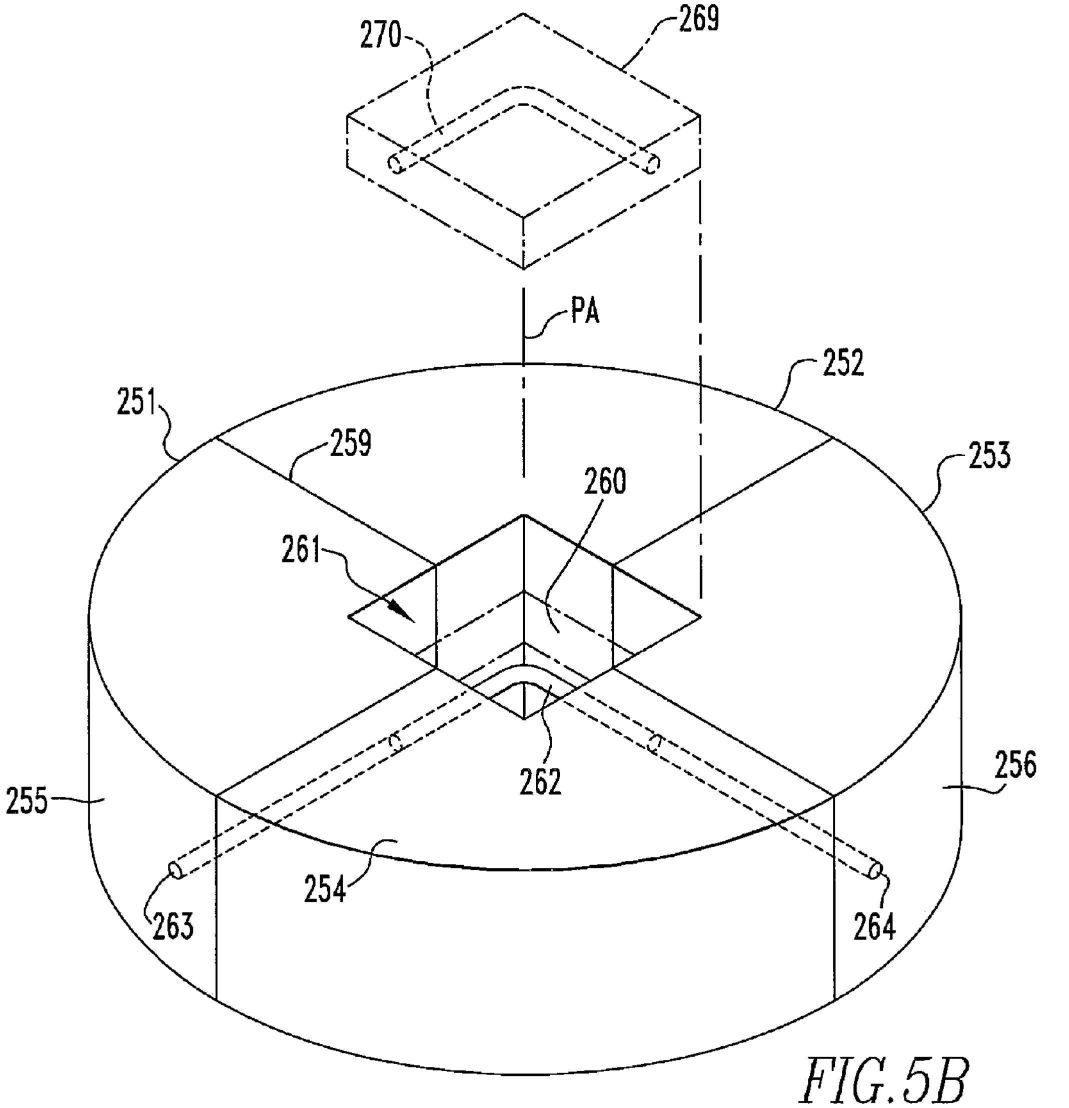
FIG. 5B is a perspective view of the split case die according to the embodiment shown in FIG. 5A in the assembled state.
Figure 5C:
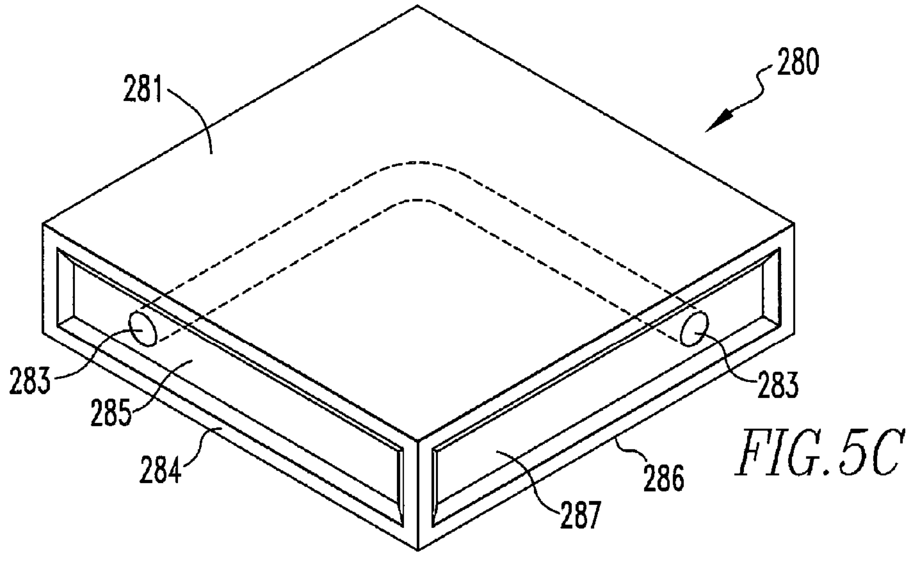
FIG. 5C is a perspective view of a green part formed by the split case die according to the embodiment shown in FIG. 5A.

In accordance with another embodiment of the present invention and with reference to FIGS. 5A-5C, a split case die 250 for use with a uni-axial press including top and bottom rams, with at least one of the top and bottom rams being movable along a pressing axis PA, is shown. The die 250 includes first 251, second 252, third 253, and fourth 254 separable die parts. The configuration of the individual separable die parts 251, 252, 253, 254 is similar to the die part 151 previously discussed herein with reference to FIG. 4B.

As shown in FIGS. 5A and 5B, the peripheral surfaces 255 of all four die parts 251, 252, 253, and 254 collectively define the periphery 256 of the die 250. The die parts 251, 252, 253, 254 are mutually engageable along each of their adjacent parting surfaces 257, 258. The die chamber portions 260 of all four die parts 251, 252, 253, 254 collectively define the die chamber 261 extending along the pressing axis PA. Though illustrated and described as including four separable die parts 251, 252, 253, 254, it is to be appreciated that the die 250, according to the present embodiment, could be provided with two or more die parts disposed opposite each other.

The die parts 251, 252, 253, 254 are movable between separated (FIG. 5A) and engaged (FIG. 5B) positions in a direction non-parallel to the pressing axis PA, as indicated by the respective arrows 265, 266, 267, 268. The die parts 251, 252, 253, 254 mutually engage along each of their adjacent parting surfaces 257, 258 to form a parting line 259. The die 250 includes first 263 and second 264 passageways extending through the die 250 between the periphery 256 of the die 250 and the die chamber 261. As shown, the first passageway 263 extends through the first die part 251 between the peripheral surface 255 and the die chamber portion 260 of the die part 251 in a direction non-parallel to the pressing axis PA along the parting surface 258 of the die part 251. The second passageway 264 extends through the third die part 253 in like manner to the first passageway 263. The first 263 and second 264 passageways extend through the respective die parts 251, 253 non-parallel to each other and to the pressing axis PA. As shown in FIG. 5A, the first 263 and second 264 passageways extend through the respective die parts 251, 253 non-parallel to the direction of movement of the die parts 251, 253 between the separated and engaged positions, as indicated by the respective arrows 265, 267. It is to be appreciated that the first 263 and second 264 passageways may pass through the respective die parts 251, 253 or another die part at any suitable angle with respect to the direction of movement of the die parts 251, 253. The die 250 further includes a first removable core rod 262 in the form of a core wire having a centerline extending along a curved path, which is configured to be inserted into the die chamber 261 via the first 263 and second 264 passageways.

With further reference to FIG. 5B, the die chamber 261 defines an envelope 269, illustrated by the broken lines above the die 250, which corresponds to the shape of the green part in the compressed state. The first removable core wire 262 defines an additional envelope 270 within the die chamber envelope 269, which corresponds to the shape of a core bore passing through the compressed green part from side to side thereof. As shown in FIG. 5C, a green part 280 formed with the die 250 includes a top surface 281. The green part 280 also has a curved core bore 283 passing therethrough between adjacent sides 284, 286. The green part 280 further includes a plurality of side surfaces 284, 286 that are imparted by the die chamber portions 260 of the die parts 251, 252, 253, 254 with certain respective surface features 285, 287, which may be chip control features in the sintered part that may assist with chip formation during a metal cutting operation. It is to be appreciated that the die parts 251, 252, 253, 254 may be configured to a number of different of surface features 285, 287 known to those having ordinary skill in the art.

Figure 6A:
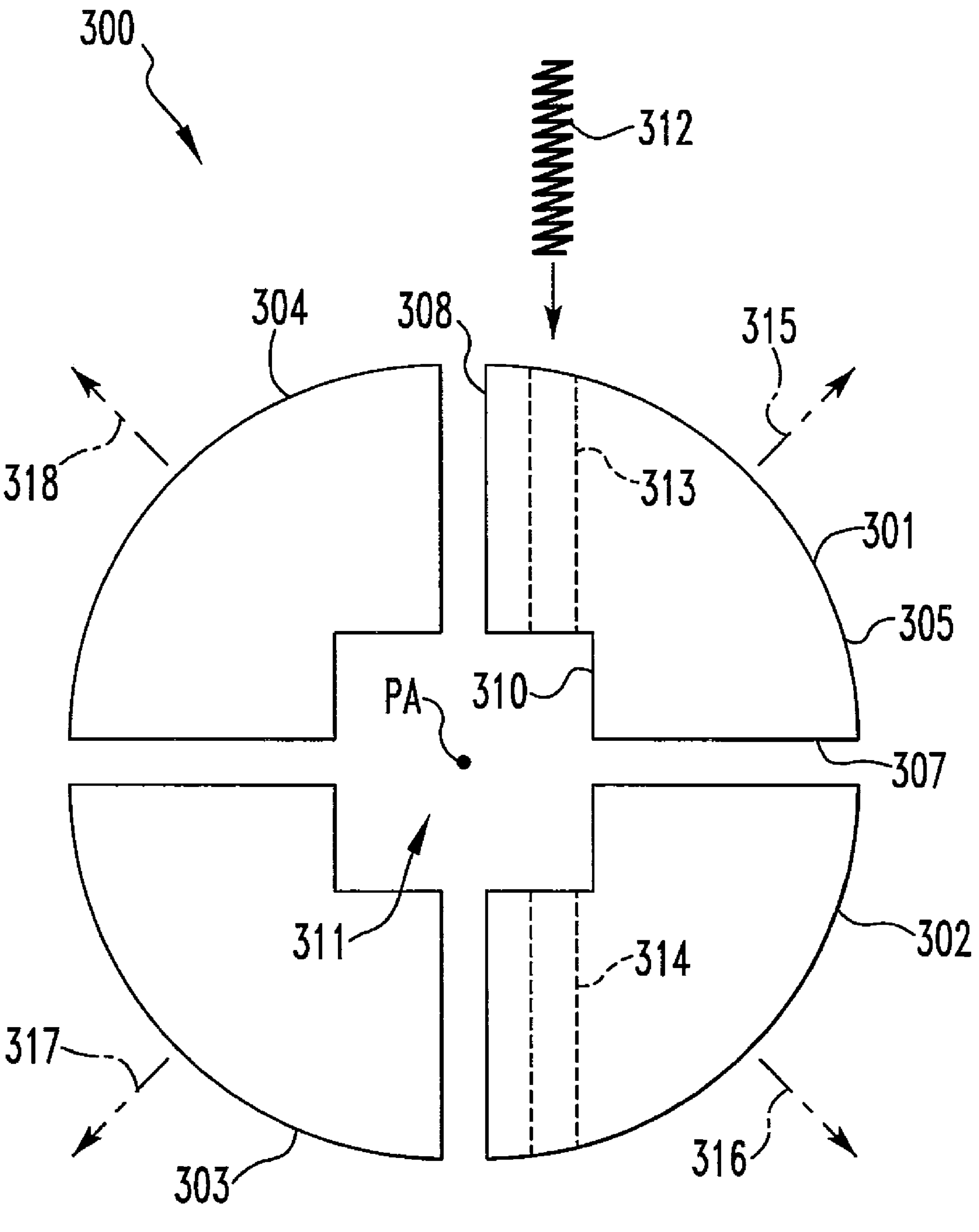
FIG. 6A is a top plan view of a split case die and removable core rod in the separated state according to another embodiment of the present invention.
Figure 6B:
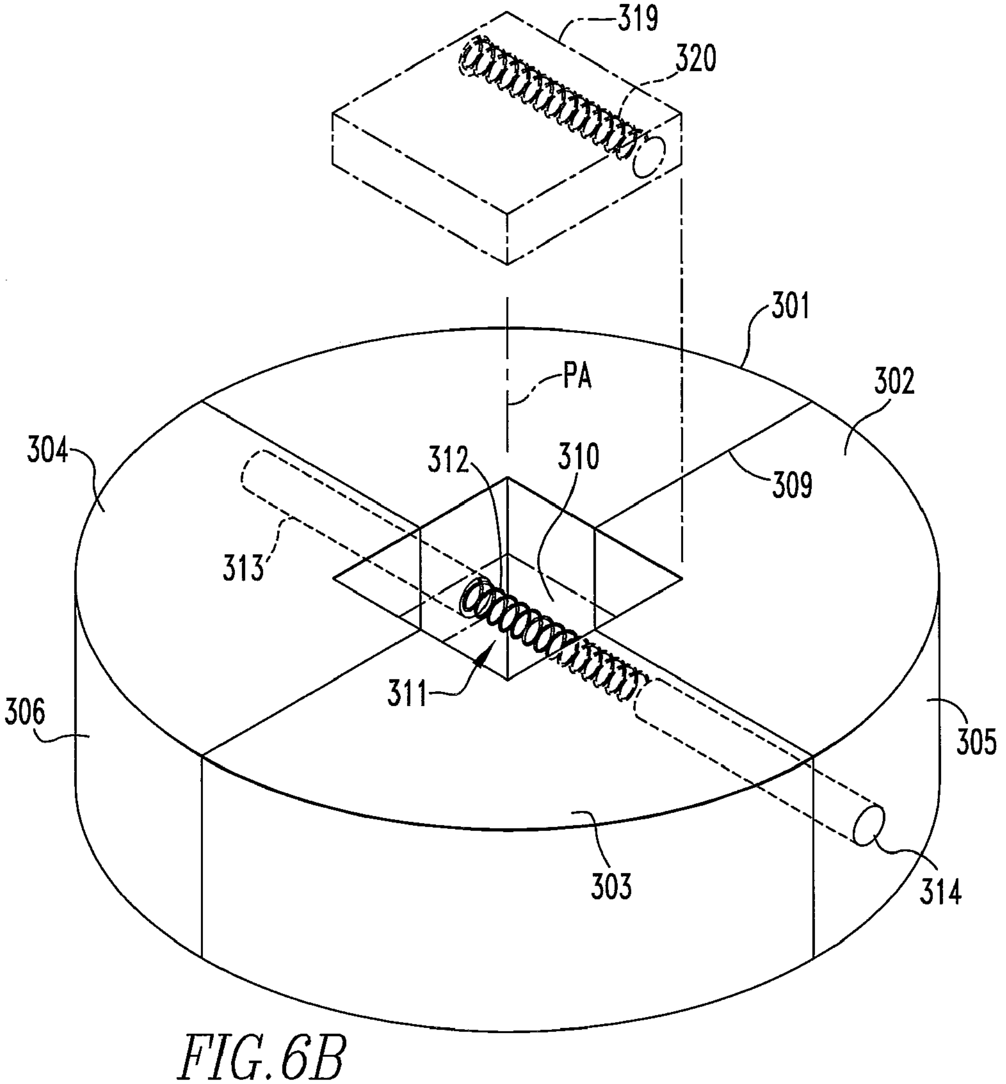
FIG. 6B is a perspective view of the split case die according to the embodiment shown in FIG. 6A in the assembled state.

In accordance with another embodiment of the present invention and with reference to FIGS. 6A and 6B, a split case die 300 for use with a uni-axial press including top and bottom rams, with at least one of the top and bottom rams being movable along a pressing axis PA, is shown. The die 300 includes first 301, second 302, third 303, and fourth 304 separable die parts. The configuration of the individual separable die parts 301, 302, 303, 304 is similar to the die part 151 previously discussed herein with reference to FIG. 4B.

As shown in FIGS. 6A and 6B, the peripheral surfaces 305 of all four die parts 301, 302, 303, and 304 collectively define the periphery 306 of the die 300. The die parts 301, 302, 303, 304 are mutually engageable along adjacent parting surfaces 307, 308. The die chamber portions 310 of all four die parts 301, 302, 303, 304 collectively define the die chamber 311 extending along the pressing axis PA. Though illustrated and described as including four separable die parts 301, 302, 303, 304, it is to be appreciated that the die 300 according to the present embodiment could be provided within only two die parts disposed opposite each other.

The die parts 301, 302, 303, 304 are movable between separated (FIG. 6A) and engaged (FIG. 6B) positions in a direction non-parallel to the pressing axis PA, as indicated by the respective arrows 315, 316, 317, 318. The die parts 301, 302, 303, 304 mutually engage along adjacent parting surfaces 307, 308 to form a parting line 309. The die 300 includes first 313 and second 314 passageways extending through the die 300 between the periphery 306 of the die 300 and the die chamber 311. As shown, the first passageway 313 extends through the first die part 301 between the peripheral surface 305 and the die chamber portion 310 of the die part 301 in a direction non-parallel to the pressing axis PA along the parting surface 308 of the die part 301. The second passageway 314 extends through the second die part 302 in like manner to the first passageway 313. The first 313 and second 314 passageways extend through the respective die parts 301, 302 co-linear with each other in a direction non-parallel to the pressing axis PA. As shown in FIG. 6A, the first 313 and second 314 passageways extend through the respective die parts 301, 302 non-parallel to the direction of movement of the die parts 301, 302 between the separated and engaged positions, as indicated by the respective arrows 315, 316. The die 300 further includes a first removable core rod 312 in the form of a core wire having a centerline extending along a helical path, which is configured to be inserted into the die chamber 311 via the first 313 and second 314 passageways.

Figure 6C:
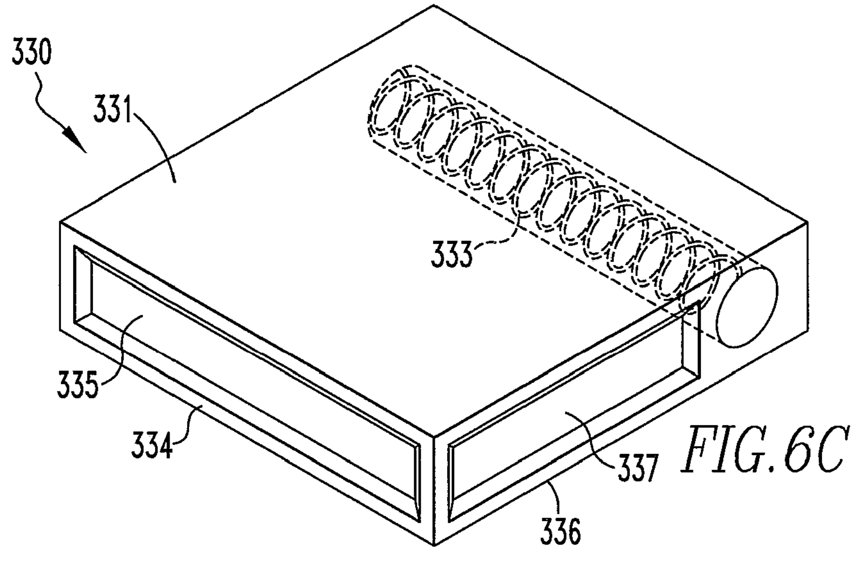
FIG. 6C is a perspective view of a green part formed by the split case die according to the embodiment shown in FIG. 6A.

With further reference to FIG. 6B, the die chamber 311 defines an envelope 319, illustrated by the broken lines above the die 300, which corresponds to the shape of the green part in the compressed state. The removable core wire 312 defines an additional envelope 320 within the die chamber envelope 319, which corresponds to the shape of a helical core bore passing through the compressed green part from side to side thereof. As shown in FIG. 6C, a green part 330 formed with the die 300 includes a top surface 331. The green part 330 also has a helical core bore 333 passing therethrough from side 336 to opposing side. The green part 330 further includes a plurality of side surfaces 334, 336 that are imparted by the die chamber portions 310 of the die parts 301, 302, 303, 304 with certain respective surface features 335, 337, which may be chip control features in the sintered part that may assist with chip formation during a metal cutting operation. It is to be appreciated that the die parts 301, 302, 303, 304 may be configured to impart a number of different surface features 335, 337 known to those having ordinary skill in the art.

Figure 7A:
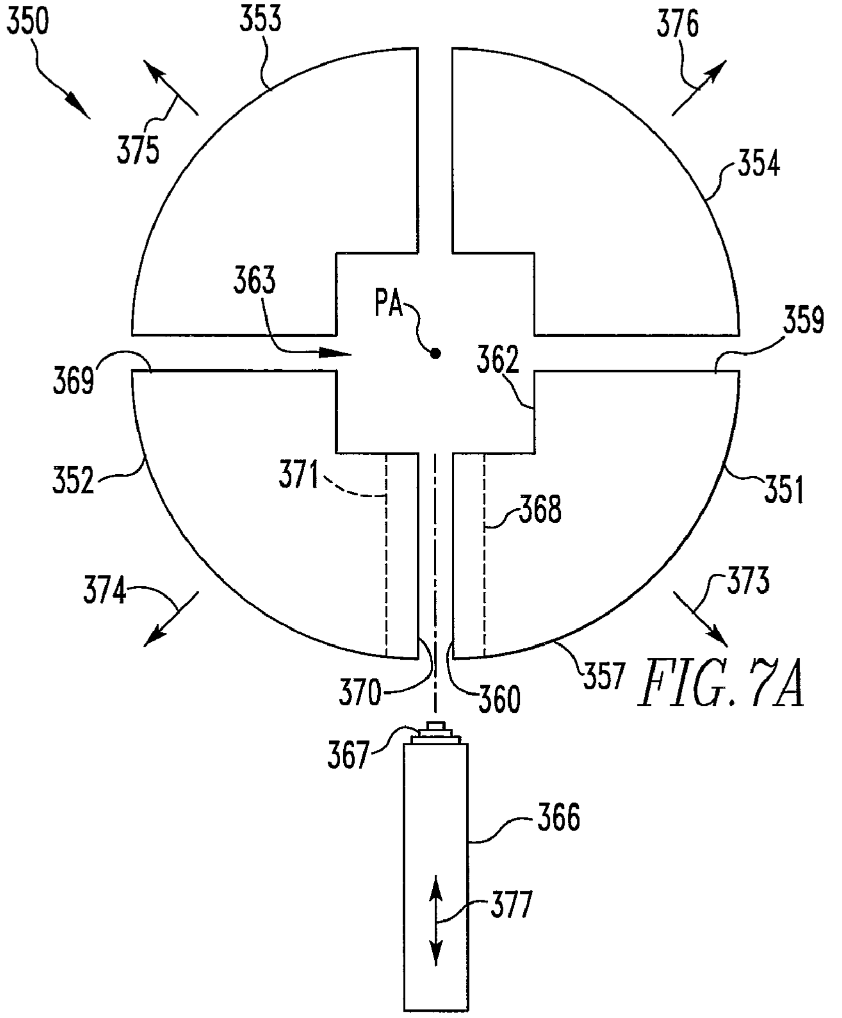
FIG. 7A is a top plan view of a split case die and removable core rod in the separated state according to another embodiment of the present invention.
Figure 7B:
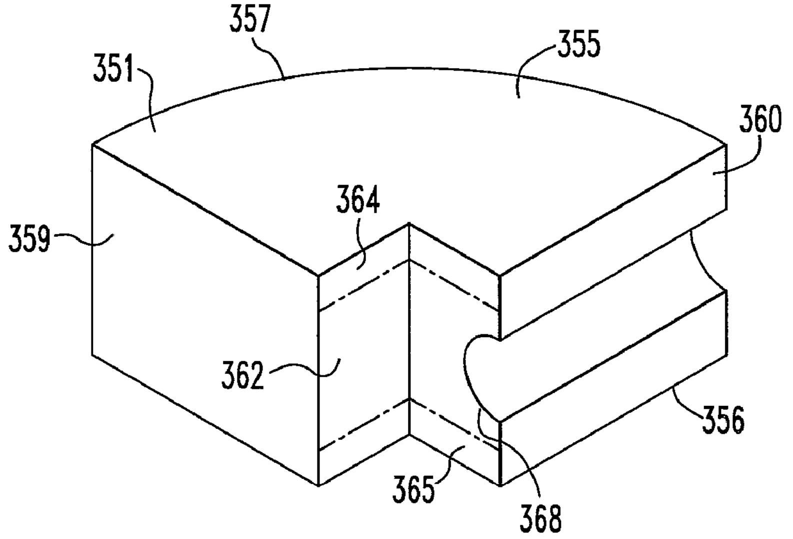
FIG. 7B is a perspective view of a die part of the split case die according to the embodiment shown in FIG. 7A.
Figure 7C:
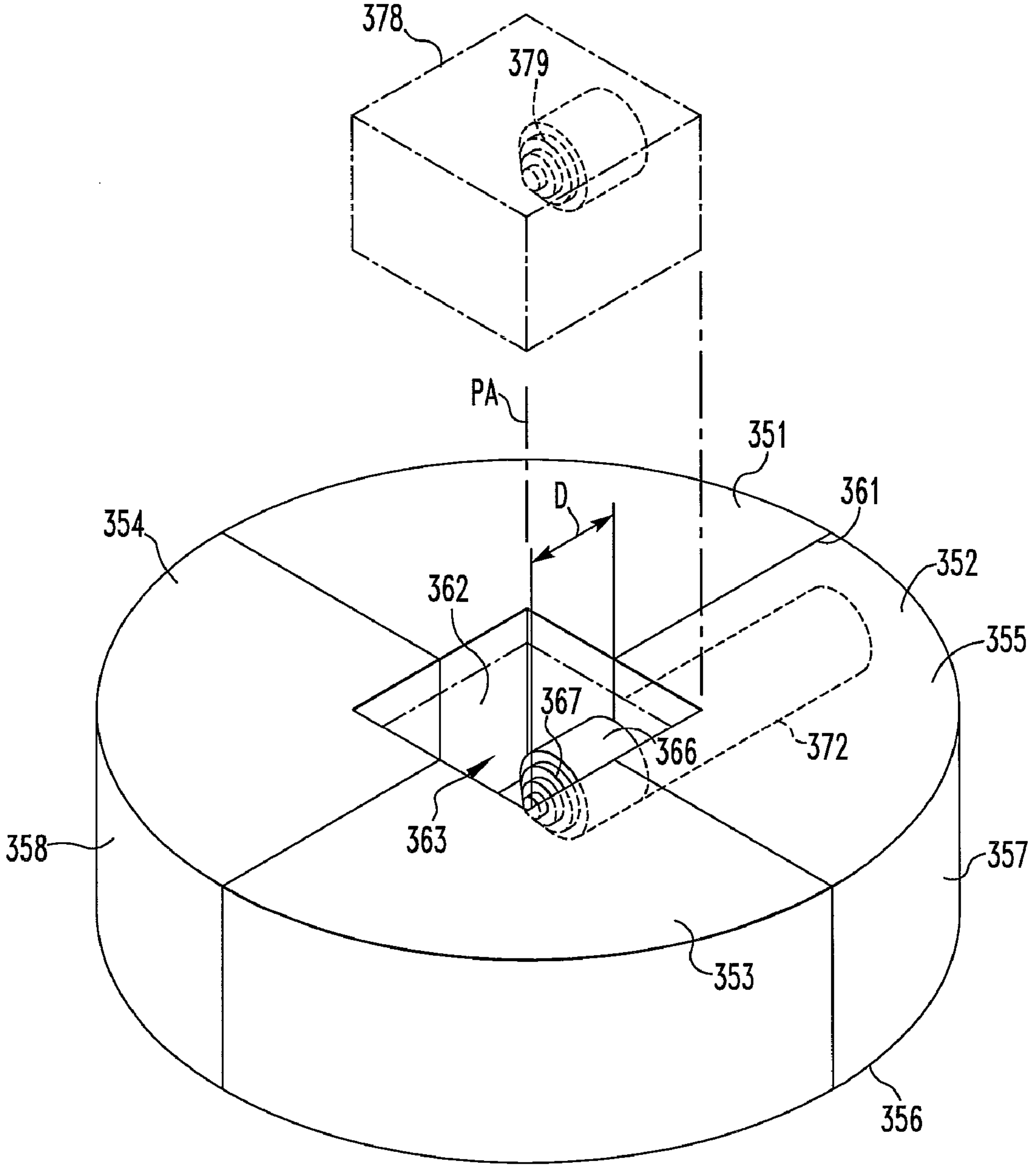
FIG. 7C is a perspective view of the split case die according to the embodiment shown in FIG. 7A in the assembled state.

In accordance with another embodiment of the present invention and with reference to to FIGS. 7A-7C, a split case die 350 for use with a uni-axial press including top and bottom rams, with at least one of the top and bottom rams being movable along a pressing axis PA, is shown. The die 350 includes first 351, second 352, third 353, and fourth 354 separable die parts. As shown in FIG. 7B, each die part 351, 352, 353, 354 includes a top surface 355 and a bottom surface 356, at least one peripheral surface 357, parting surfaces 359, 360 (the second die part 352 has parting surfaces 369 and 370 shown in FIG. 7A) extending between the top 355 and bottom 356 surfaces of the die part 351, 352, 353, 354, a die chamber portion 362 and top 364 and bottom 365 pressing bore portions extending between the die chamber portion 362 and the top 355 and bottom 356 surfaces, respectively. The first 351 and second 352 die parts also each include a respective passageway portion 368, 371 defined in adjacent parting surfaces 360, 370 of the first 351 and second 352 die parts, respectively.

As shown in FIGS. 7A and 7C, the top 355 and bottom 356 surfaces of all four die parts 351, 352, 353, 354 collectively define the top and bottom surfaces of the die 350. The peripheral surfaces 357 of all four die parts 351, 352, 353, 354 collectively define the periphery 358 of the die 350. The die parts 351, 352, 353, 354 are mutually engageable along each of their adjacent parting surfaces 359, 360. The die chamber portions 362 of all four die parts 351, 352, 353, 354 collectively define the die chamber 363. The top 364 and bottom 365 pressing bore portions of all four die parts 351, 352, 353, 354 collectively define the top and bottom pressing bores extending from the die chamber 363 to the top and bottom surfaces of the die 350. Though illustrated and described as including four separable die parts 351, 352, 353, 354, it is to be appreciated that the die 350 according to the present embodiment could be provided with two or more die parts disposed opposite each other.

The die parts 351, 352, 353, 354 are movable between separated (FIG. 7A) and engaged (FIG. 7C) positions in a direction non-parallel to the pressing axis PA, as indicated by the respective arrows 373, 374, 375, 376. The die parts 351, 352, 353, 354 mutually engage along each of their adjacent parting surfaces 359, 360 to form a parting line 361. The adjacent parting surfaces 360, 370 of the first 351 and second 352 die parts each include a respective passageway portion 368, 371, which collectively define a first passageway 372. The first passageway 372 extends through the die 350 between the periphery 358 of the die 350 and the die chamber 363 in a direction non-parallel to the pressing axis PA.

The die 350 further includes a first removable core rod 366, which is configured to be inserted into the die chamber 363 via the first passageway 372, as indicated by the arrow 377. The first removable core rod 366 includes a shaped impression 367 formed at an end thereof. The end having the shaped impression 367 is configured to be inserted into the die chamber 363 via the first passageway 372 a distance D no greater than a distance between the die cavity portion 362 of the first die part 351 and the pressing axis PA to avoid creating a core bore extending through the green part. As shown in FIG. 7A, the shaped impression 367 includes a plurality of stepped protrusions extending concentrically from the end of the removable core rod 366.

Figure 7D:
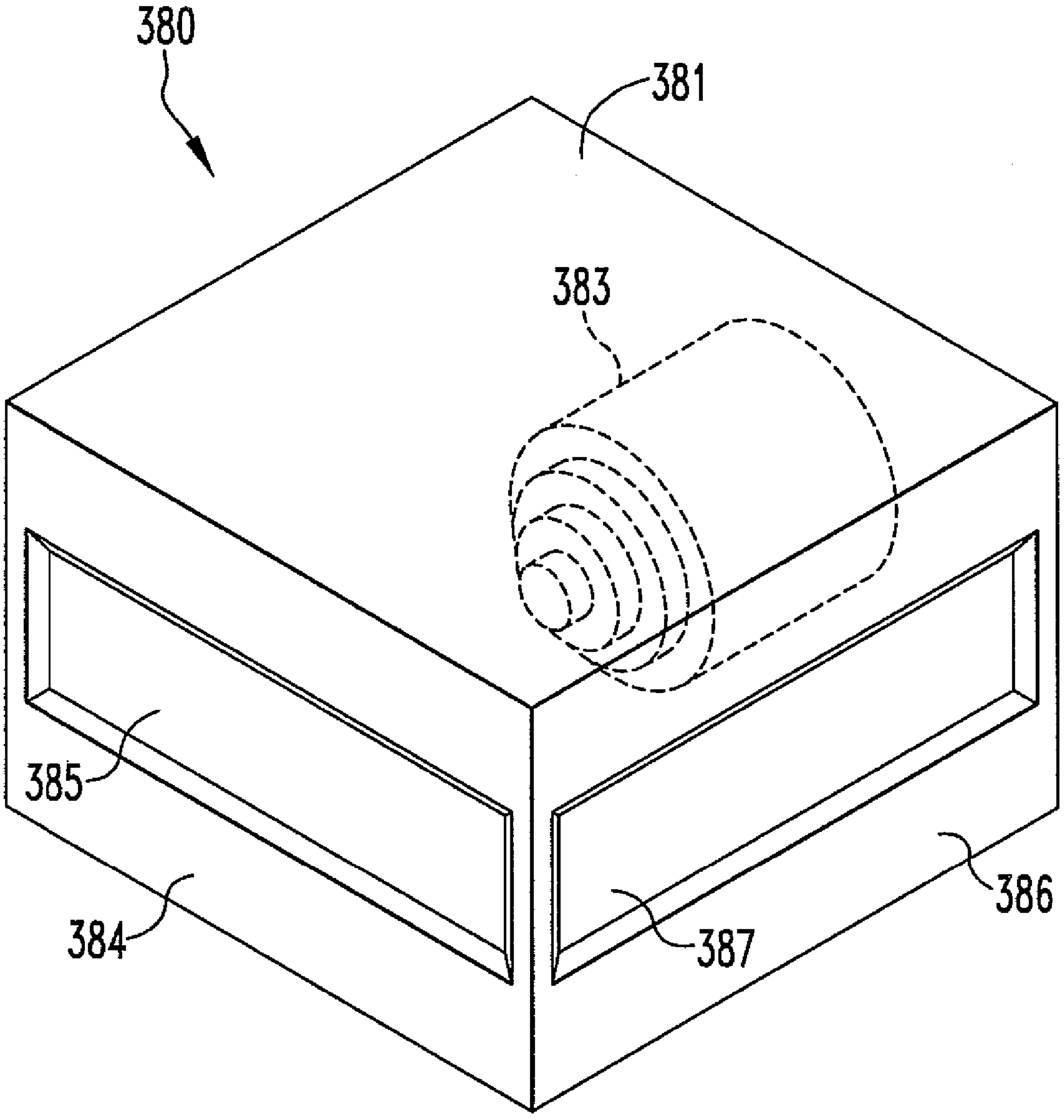
FIG. 7D is a perspective view of a green part formed by the split case die according to the embodiment shown in FIG. 7A.

With further reference to FIG. 7C, the die chamber 363 defines an envelope 378, illustrated by the broken lines above the die 350, which corresponds to the shape of the green part in the compressed state. The first removable core rod 366 and shaped impression 367 define an additional envelope 379 within the die chamber envelope 378, which corresponds to the shape of a recess extending into the compressed green part from a side thereof. As shown in FIG. 7D, a green part 380 formed with the die 350 includes a top surface 381. The green part 380 also has a stepped recess 383 extending into the green part 380 from a side thereof. The green part 380 further includes a plurality of side surfaces 384, 386 that are imparted by the die chamber portions 362 of the die parts 351, 352, 353, 354 with certain respective surface features 385, 387, which may be chip control features in the sintered part that may assist with chip formation during a metal cutting operation. It is to be appreciated that the die parts 351, 352, 353, 354 may be configured to impart a number of different surface features 385, 387 known to those having ordinary skill in the art.

Figure 8A:
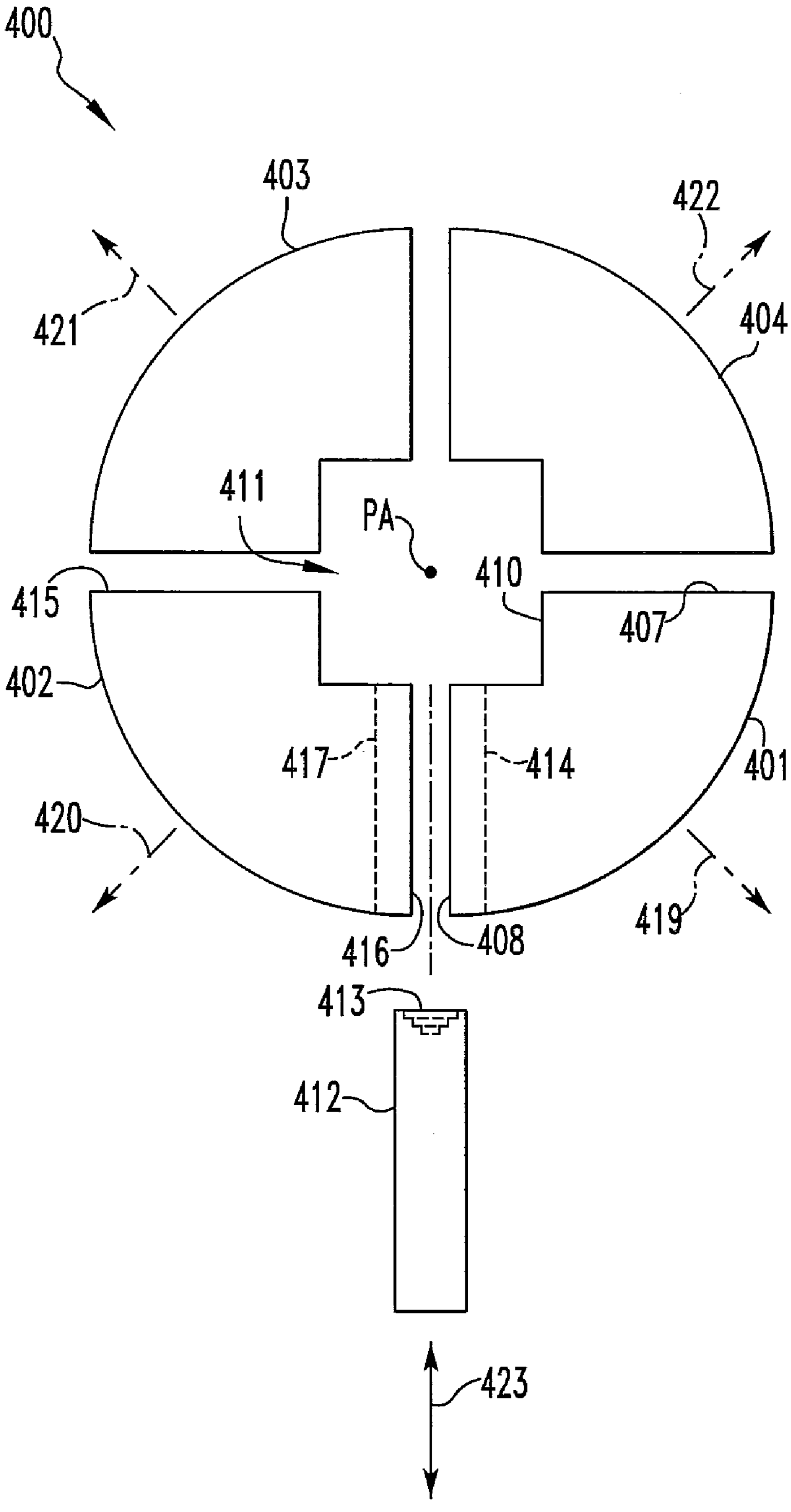
FIG. 8A is a top plan view of a split case die and removable core rod in the separated state according to another embodiment of the present invention.
Figure 8B:
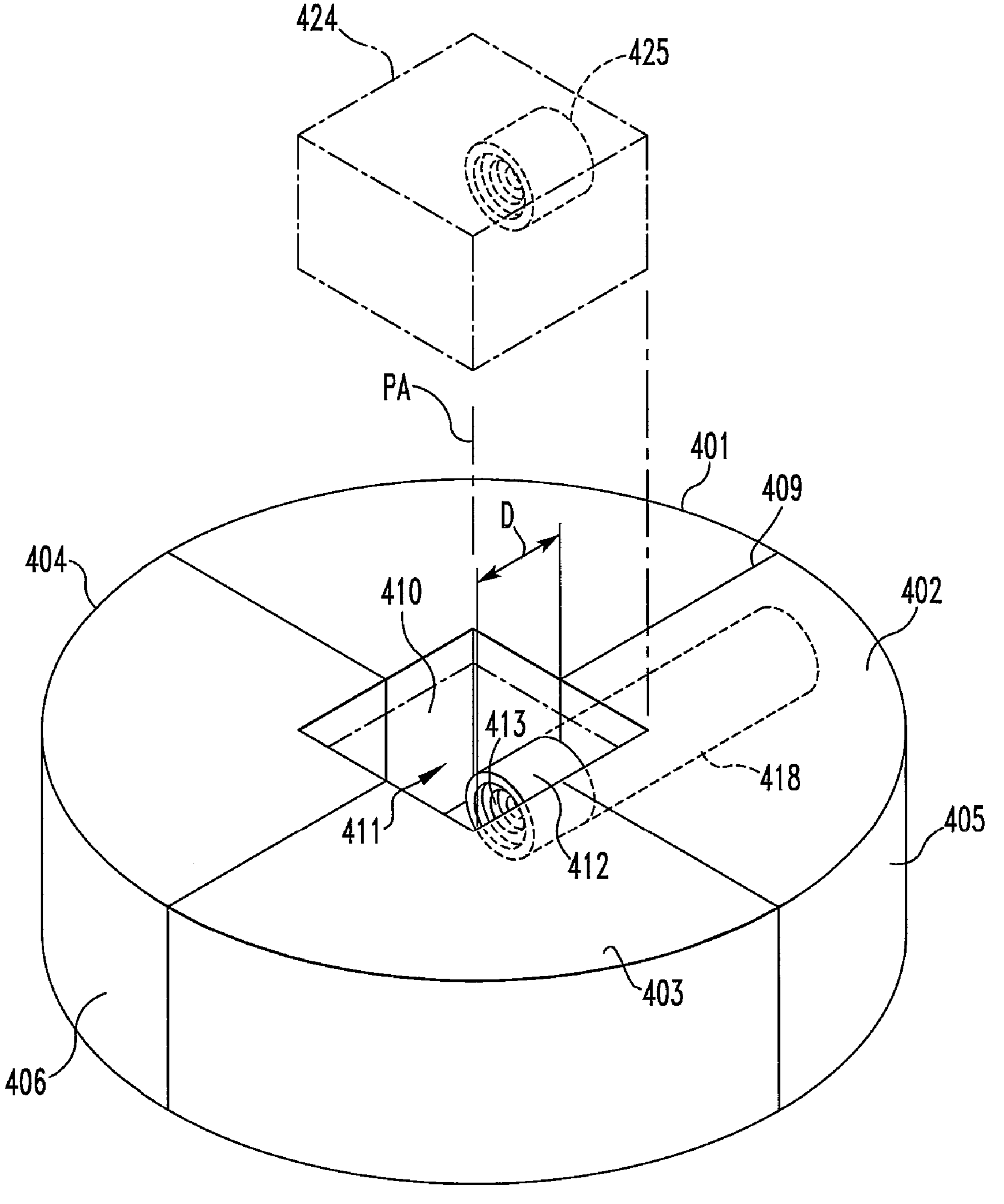
FIG. 8B is a perspective view of the split case die according to the embodiment shown in FIG. 8A in the assembled state.

In accordance with another embodiment of the present invention and with reference to FIGS. 8A and 8B, a split case die 400 for use with a uni-axial press including top and bottom rams, with at least one of the top and bottom rams being movable along a pressing axis PA, is shown. The die 400 includes first 401, second 402, third 403, and fourth 404 separable die parts. The configuration of the individual separable die parts 401, 402, 403, 404 is similar to the die part 351 previously discussed herein with reference to FIG. 8B.

As shown in FIGS. 8A and 8B, peripheral surfaces 405 of all four die parts 401, 402, 403, 404 collectively define the periphery 406 of the die 400. The die parts 401, 402, 403, 404 are mutually engageable along adjacent parting surfaces 407, 408, 415, 416. The die chamber portions 410 of all four die parts 401, 402, 403, 404 collectively define the die chamber 411. Though illustrated and described as including four separable die parts 401, 402, 403, 404, it is to be appreciated that the die 400, according to the present embodiment, could be provided with two or more die parts disposed opposite each other.

The die parts 401, 402, 403, 404 are movable between separated (FIG. 8A) and engaged (FIG. 8B) positions in a direction non-parallel to the pressing axis PA, as indicated by the respective arrows 419, 420, 421, 422. The die parts 401, 402, 403, 404 mutually engage along each of their adjacent parting surfaces 408, 416 to form a parting line 409. The adjacent parting surfaces 408, 416 of the first 401 and second 402 die parts each include a respective passageway portion 414, 417, which collectively define a first passageway 418. The first passageway 418 extends through the die 400 between the periphery 406 of the die 400 and the die chamber 411 in a direction non-parallel to the pressing axis PA.

The die 400 further includes a first removable core rod 412, which is configured to be inserted into the die chamber 411 via the first passageway 418 as indicated by the arrow 423. The first removable core rod 412 includes a shaped impression 413 formed at an end thereof. The end having the shaped impression 413 is configured to be inserted into the die chamber 411 via the first passageway 418 a distance D no greater than a distance between the die cavity portion 410 of the first die part 401 and the pressing axis PA to avoid creating a core bore extending through the green part. As shown in FIG. 8A, the shaped impression 413 includes a plurality of stepped recesses extending concentrically from the end into the removable core rod 412.

Figure 8C:
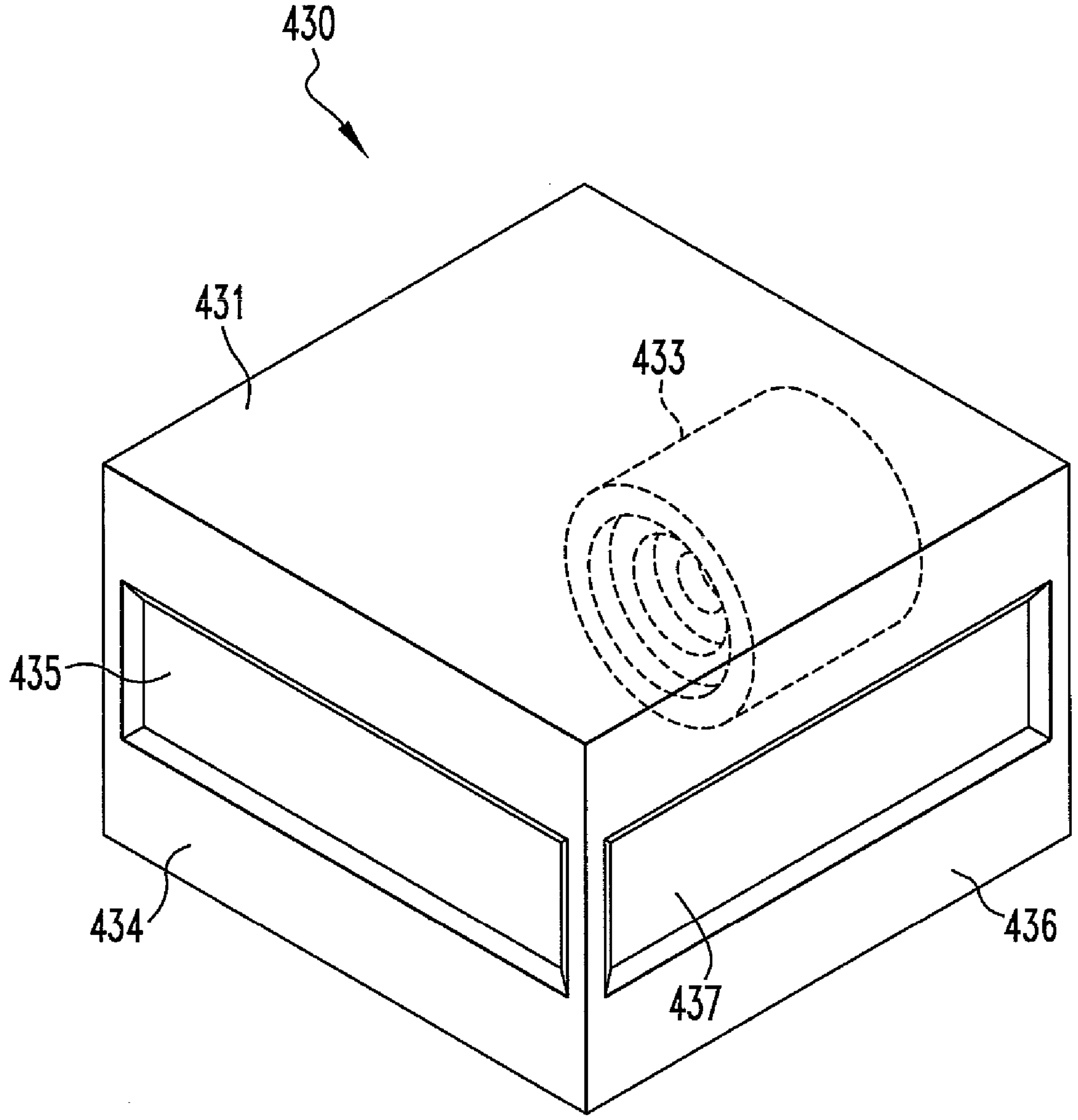
FIG. 8C is a perspective view of a green part formed by the split case die according to the embodiment shown in FIG. 8A.

With further reference to FIG. 8B, the die chamber 411 defines an envelope 424, illustrated by the broken lines above the die 400, which corresponds to the shape of the green part in the compressed state. The first removable core rod 412 and shaped impression 413 define an additional envelope 425 within the die chamber envelope 424, which corresponds to the shape of a recess extending into the compressed green part from a side thereof. As shown in FIG. 8C, a green part 430 formed with the die 400 includes a top surface 431. The green part 430 also has a recess 433 extending into the green part 430 from a side 434 thereof. The recess 433 includes a plurality of concentric protrusions extending from a base of the recess 433 toward the side 434 of the green part 430. The green part 430 further includes a plurality of side surfaces 434, 436 that are imparted by the die chamber portions 410 of the die parts 401, 402, 403, 404 with certain respective surface features 435, 437, which may be chip control features in the sintered part that may assist with chip formation during a metal cutting operation. It is to be appreciated that the die parts 401, 402, 403, 404 may be configured to impart a number of different surface features 435, 437 known to those having ordinary skill in the art.

Figure 9A:
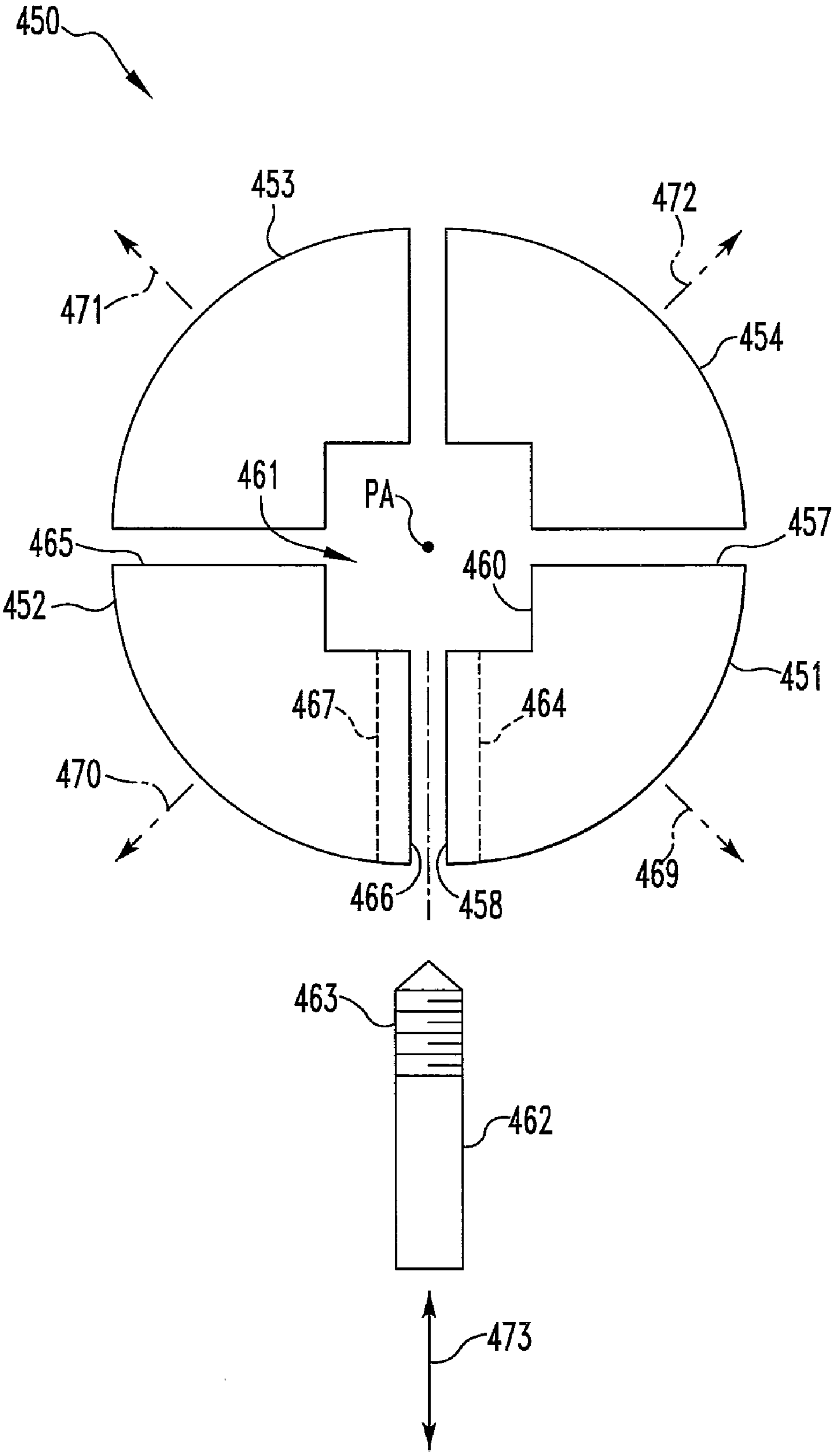
FIG. 9A is a top plan view of a split case die and removable core rod in the separated state according to another embodiment of the present invention.
Figure 9B:
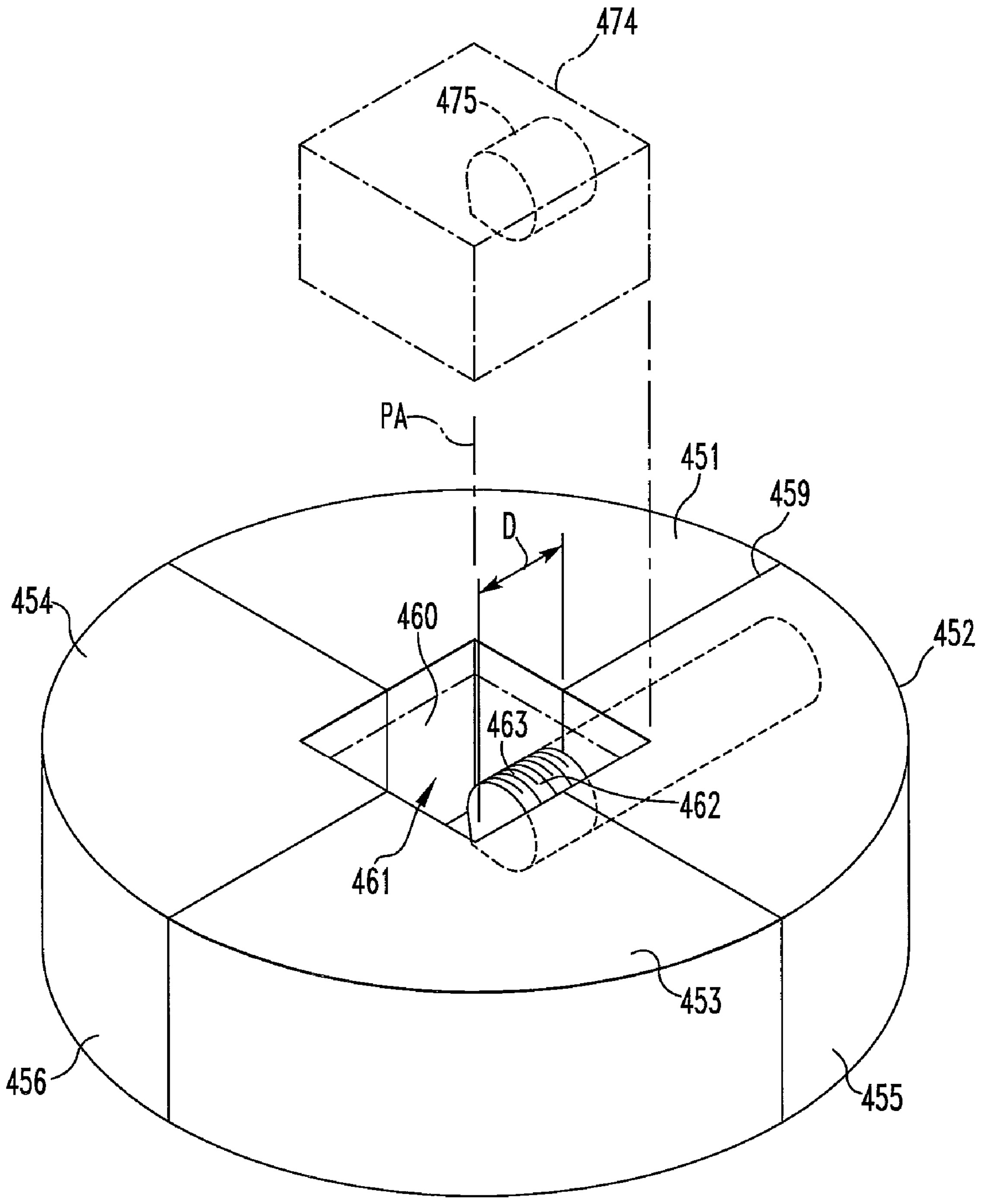
FIG. 9B is a perspective view of the split case die according to the embodiment shown in FIG. 9A in the assembled state.

In accordance with another embodiment of the present invention and with reference to FIGS. 9A and 9B, a split case die 450 for use with a uni-axial press including top and bottom rams, with at least one of the top and bottom rams being movable along a pressing axis PA, according to an embodiment of the present invention, is shown. The die 450 includes first 451, second 452, third 453 and fourth 454 separable die parts. The configuration of the individual separable die parts 451, 452, 453, 454 is similar to the die part 351 previously discussed herein with reference to FIG. 8B.

As shown in FIGS. 9A and 9B, peripheral surfaces 455 of all four die parts 451, 452, 453, 454 collectively define the periphery 456 of the die 450. The die parts 451, 452, 453, 454 are mutually engageable along adjacent parting surfaces 457, 458, 465, 466. The die chamber portions 460 of all four die parts 451, 452, 453, 454 collectively define the die chamber 461. Though illustrated and described as including four separable die parts 451, 452, 453, 454, it is to be appreciated that the die 450 according to the present embodiment could be provided with two or more die parts disposed opposite each other.

The die parts 451, 452, 453, 454 are movable between separated (FIG. 9A) and engaged (FIG. 9B) positions in a direction non-parallel to the pressing axis PA, as indicated by the respective arrows 469, 470, 471, 472. The die parts 451, 452, 453, 454 mutually engage along each of their adjacent parting surfaces 458, 466 to form a parting line 459. The adjacent parting surfaces 458, 466 of the first 451 and second 452 die parts each include a respective passageway portion 464, 467, which collectively define a first passageway 468. The first passageway 468 extends through the die 450 between the periphery 456 of the die 450 and the die chamber 461 in a direction non-parallel to the pressing axis PA.

The die 450 further includes a first removable core rod 462, which is configured to be inserted into the die chamber 461 via the first passageway 468, as indicated by the arrow 473. The first removable core rod 462 includes a shaped impression 463 formed in the side of the rod at the end thereof. The end having the shaped impression 463 is configured to be inserted into the die chamber 461 via the first passageway 468 a distance D no greater than a distance between the die cavity portion 460 of the first die part 451 and the pressing axis PA so as to avoid creating a core bore extending through the green part. As shown in FIG. 9A, the shaped impression 463 includes threading formed in the side of the removable core rod 462 at the end of the rod 462.

Figure 9C:
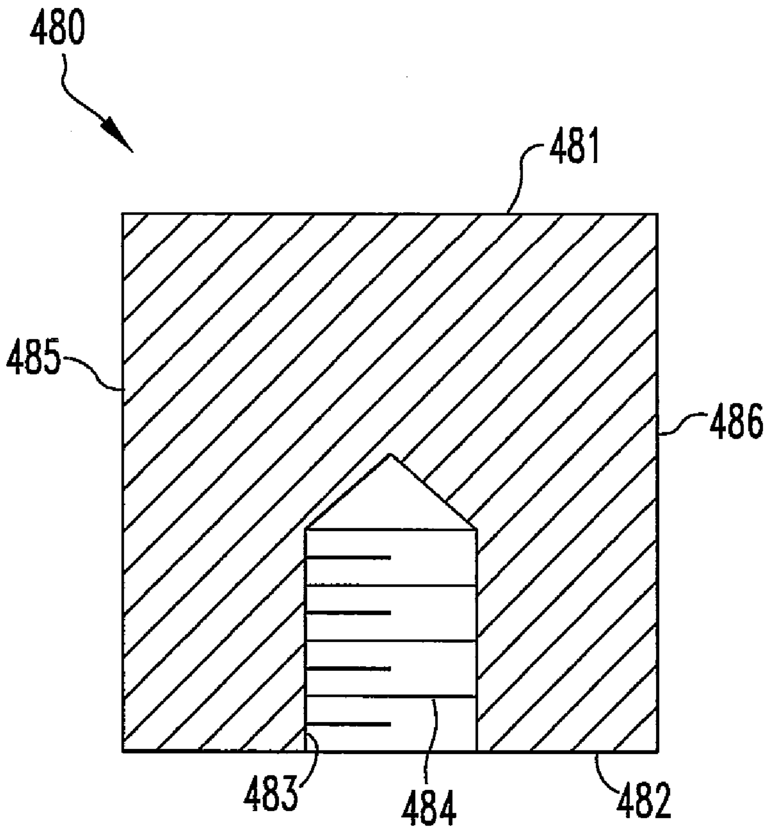
FIG. 9C is a perspective view of a green part formed by the split case die according to the embodiment shown in FIG. 9A.

With further reference to FIG. 9B, the die chamber 461 defines an envelope 474, illustrated by the broken lines above the die 450, which corresponds to the shape of the green part in the compressed state. The first removable core rod 462 and shaped impression 463 define an additional envelope 475 within the die chamber envelope 474, which corresponds to the shape of a threaded recess extending into the compressed green part from a side thereof. As shown in FIG. 9C, a green part 480 formed with the die 450 includes a top surface 481, a bottom surface 482, and two opposing side surfaces 485, 486. The green part may having one or more cutting edges and any number of different side surface features formed thereon by the die chamber portions 460 of the die parts 451, 452, 453, 454, as discussed above with reference to the previously discussed embodiments. The green part 480 also has a threaded recess 483 formed with threading 484 and extending into the green part 480 from the bottom surface 482 thereof. The threading 484 in the recess 483 is provided to allow the finished insert to be attached to a threaded shaft of a tool-holder as is known to those having ordinary skill in the art.

Figure 9D:
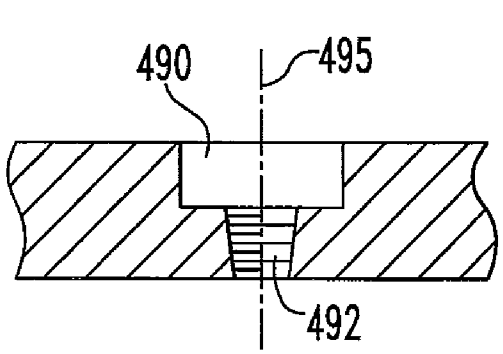
FIG. 9D is a schematic illustrating an alternative die chamber for a spit case die according to another embodiment of the present invention.

With reference to FIG. 9D, a die chamber and green part according to another embodiment of the present invention is shown. The die chamber 495 includes a spiral flute 492 co-axial with the pressing axis and is capable of imparting to the green part 490 with the features a spiral flute 492, such as threading. This arrangement also is ideally suited for the split case die in accordance with the subject invention. For instance, the green part 490 may be formed similar to the green part 480 discussed above with reference to FIG. 9C but with a threaded shaft for attachment to an appropriate tool-holder as opposed to a threaded passageway. Alternatively, the spiral flute 492 may form a flute in the green part 490 for evacuating chips from the cutting edges of the green part 490.

Figure 10A:
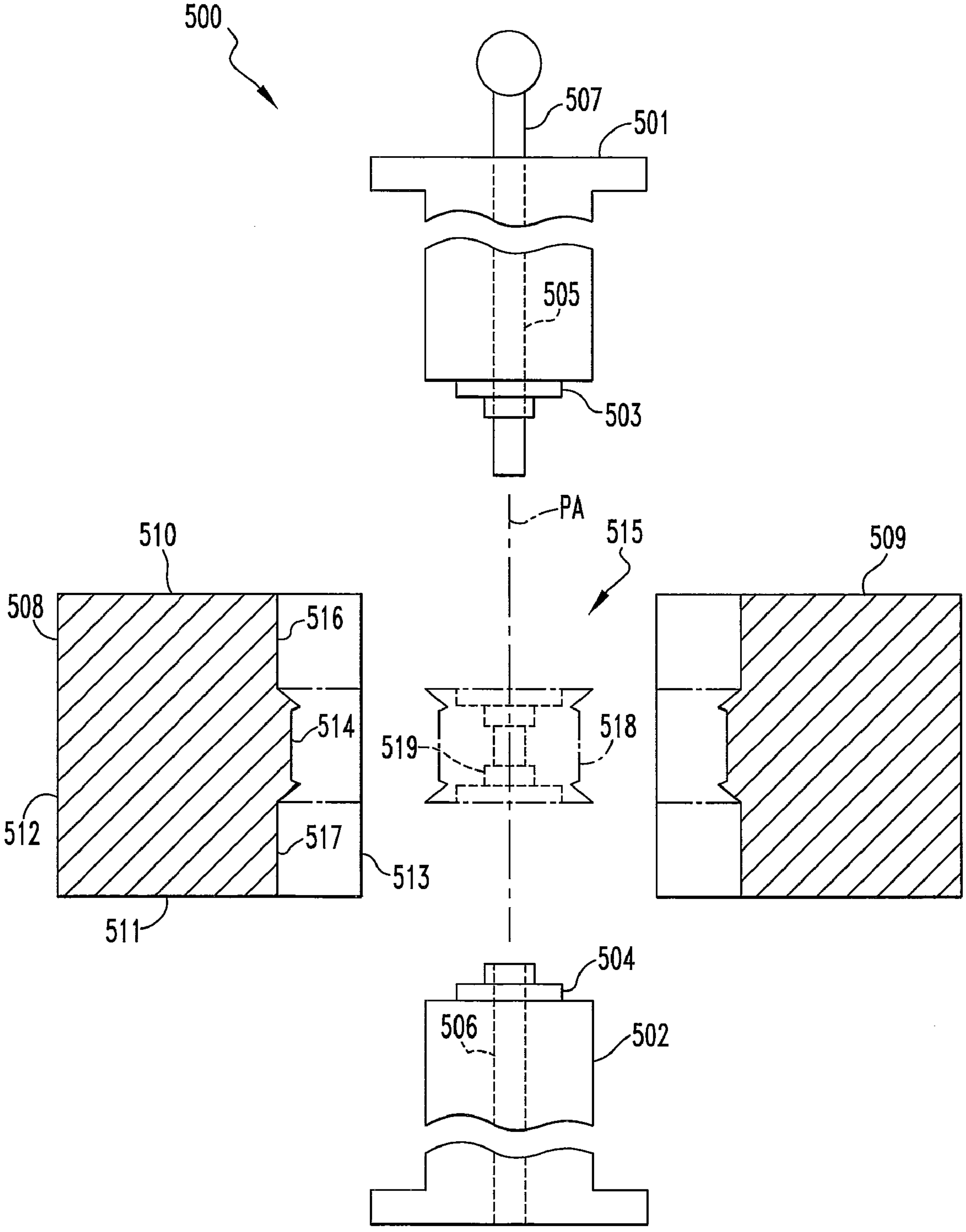
FIG. 10A is a schematic illustrating a split case die and top and bottom rams according to another embodiment of the present invention.
Figure 10B:
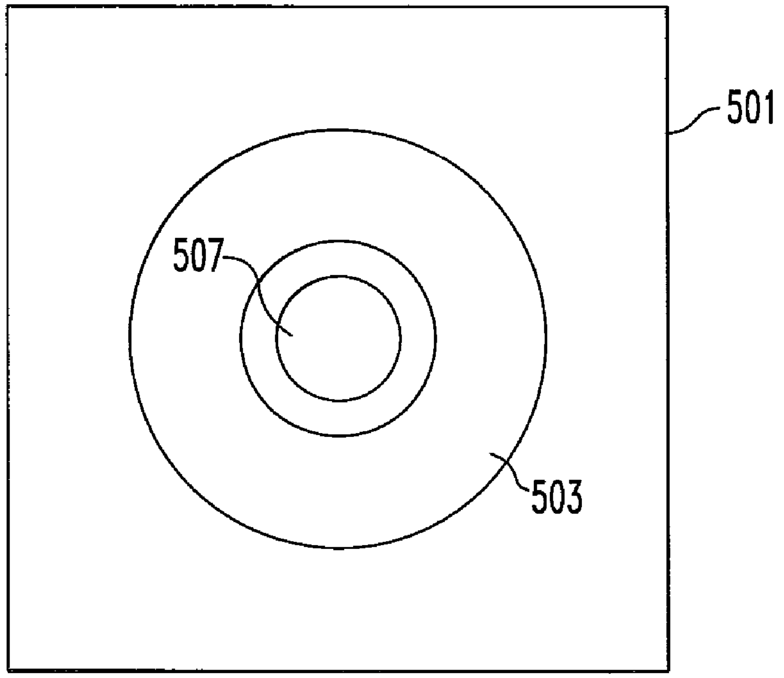
FIG. 10B is an end view of the top ram according to the embodiment shown in FIG. 10A.

In accordance with another embodiment of the present invention and with reference to FIGS. 10A and 10B, a uni-axial press 500 for forming a compressed part from powder according to another embodiment of the present invention is shown. The uni-axial press 500 includes a top ram 501 and a bottom ram 502, which are movable relative to one another along a pressing axis PA, and first 508 and second 509 die parts. Each of the first 508 and second 509 die parts includes a top surface 510 and a bottom surface 511, at least one peripheral surface 512, a parting surface 513 extending between the top 510 and bottom 511 surfaces of the die part 508, 509 in a direction non-perpendicular to the pressing axis PA, a die chamber portion 514 and top 516 and bottom 517 pressing bore portions extending between the die chamber portion 514 and the top 510 and bottom 511 surfaces, respectively.

As shown in FIG. 10A, the top 510 and bottom 511 surfaces of the first 508 and second 509 die parts collectively define the top and bottom surfaces of the die. The peripheral surfaces 509 of the first 505 and second 506 die parts collectively define the periphery of the die. The die parts 508 and 509 are mutually engageable along each of their adjacent parting surfaces 513. The die chamber portions 514 of the first 509 and second 509 die parts at least partially define a die chamber 515 extending along the pressing axis PA. The top 516 and bottom 517 pressing bore portions of the first 508 and second 509 die parts at least partially define the top and bottom pressing bores extending from the die chamber 515 to the top and bottom surfaces of the die, respectively.

Alternatively, the uni-axial press 500 may further include third and fourth separable die parts similar to the first 508 and second 509 die parts, for instance, as shown in FIG. 2. The top 510 and bottom 511 surfaces of all four die parts collectively define the top and bottom surfaces of the die. The peripheral surfaces 512 of all four die parts collectively define the periphery of the die. The four die parts are mutually engageable along each of their adjacent parting surfaces 513. The die chamber portions 511 of all four die parts collectively define the die chamber 512. The top 513 and bottom 514 pressing bore portions of all four die parts collectively define the top and bottom pressing bores.

The die parts 505, 506 are movable between separated (FIG. 10A) and engaged positions in a direction non-parallel to the pressing axis PA. The top 501 and bottom 502 rams are movable along the pressing axis PA through the top and bottom pressing bores, respectively, into the die chamber 512. At least one of, or alternatively both, of the top 501 and bottom 502 rams includes a respective shaped impression 503, 504 formed at an end thereof. The end of the top 501 and bottom 502 ram having the shaped impression 503, 504 is configured to be inserted into the die chamber 512 through a respective pressing bore. The top and bottom rams 501, 502 also each include a respective central bore 505, 506, which slidably receive a removable pin 507 that extends through the central bore 505 in the top ram 501 and into the central bore 506 in the bottom die part 502, or vice versa. As shown in FIGS. 10A and 10B, the shaped impressions 503, 504 on the top 501 and bottom 502 rams each include a plurality of concentric stepped protrusions extending from the end of the ram 501, 502. The central bores 505, 506 also extend through the stepped protrusions 503, 504 so that the pin 507 effectively forms part of the shaped impression of the rams 501, 504. In use, the top 501 and bottom rams 502 are disposed in sufficiently proximate so that the pin 507 extends from the central bore 505 in the top ram 501 into the central bore 506 in the bottom ram 502.

Figure 10C:
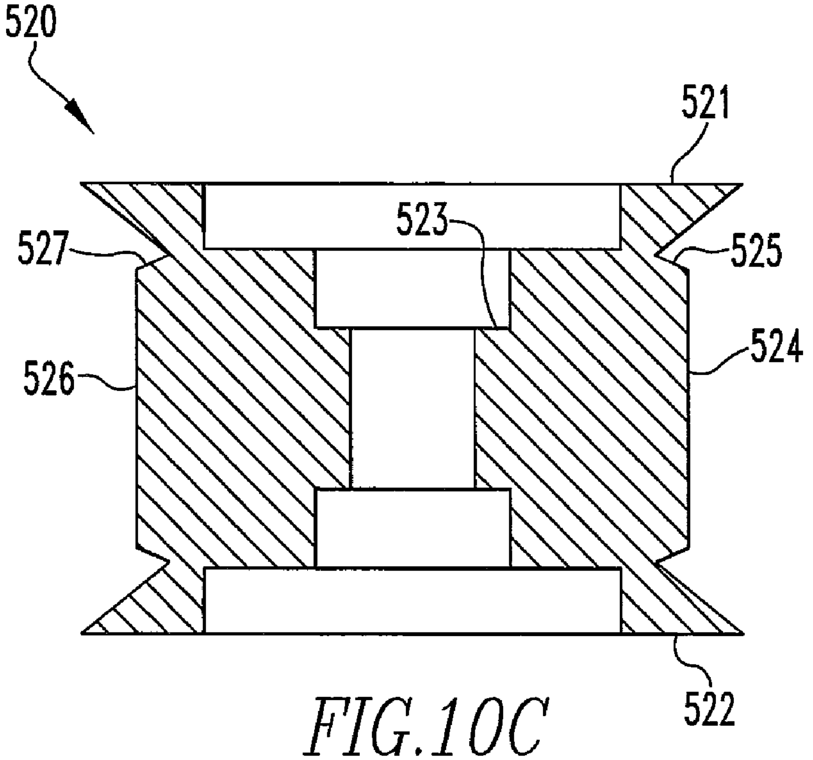
FIG. 10C is a cross-sectional side view of a green part formed by the split case die and top and bottom rams according to the embodiment shown in FIG. 10A.

Accordingly, as shown in FIG. 10A the die chamber 512 defines an envelope 515, illustrated by the broken lines in the center of the die chamber 512, which corresponds to the shape of the green part in the compressed state. The impressions 503, 504 on the respective top 501 and bottom 502 rams extend into the die chamber 512 and the pin 507 passes through the die chamber 512 between the impressions 503, 504 to define an envelope 516, which corresponds to the shape of a stepped bore passing through the compressed green part from top to bottom thereof. As shown in FIG. 10C, a green part 520 formed with the uni-axial press 500 includes a top surface 521 and a bottom surface 522. A stepped bore 523, formed by the shaped impressions 503, 504 on the top 501 and bottom 502 rams and the pin 507, passes through the green part 520 from the top surface 521 to the bottom surface 522. The green part 520 further includes a plurality of side surfaces 524, 526 that are imparted by the die chamber portions 511 of the die parts 505, 506 with certain respective surface features 525, 527, which may be chip control features in the sintered part that may assist with chip formation during a metal cutting operation. It is to be appreciated that the die parts 505, 506 may be configured to impart a number of different surface features 525, 527 known to those having ordinary skill in the art.

Figure 11A:
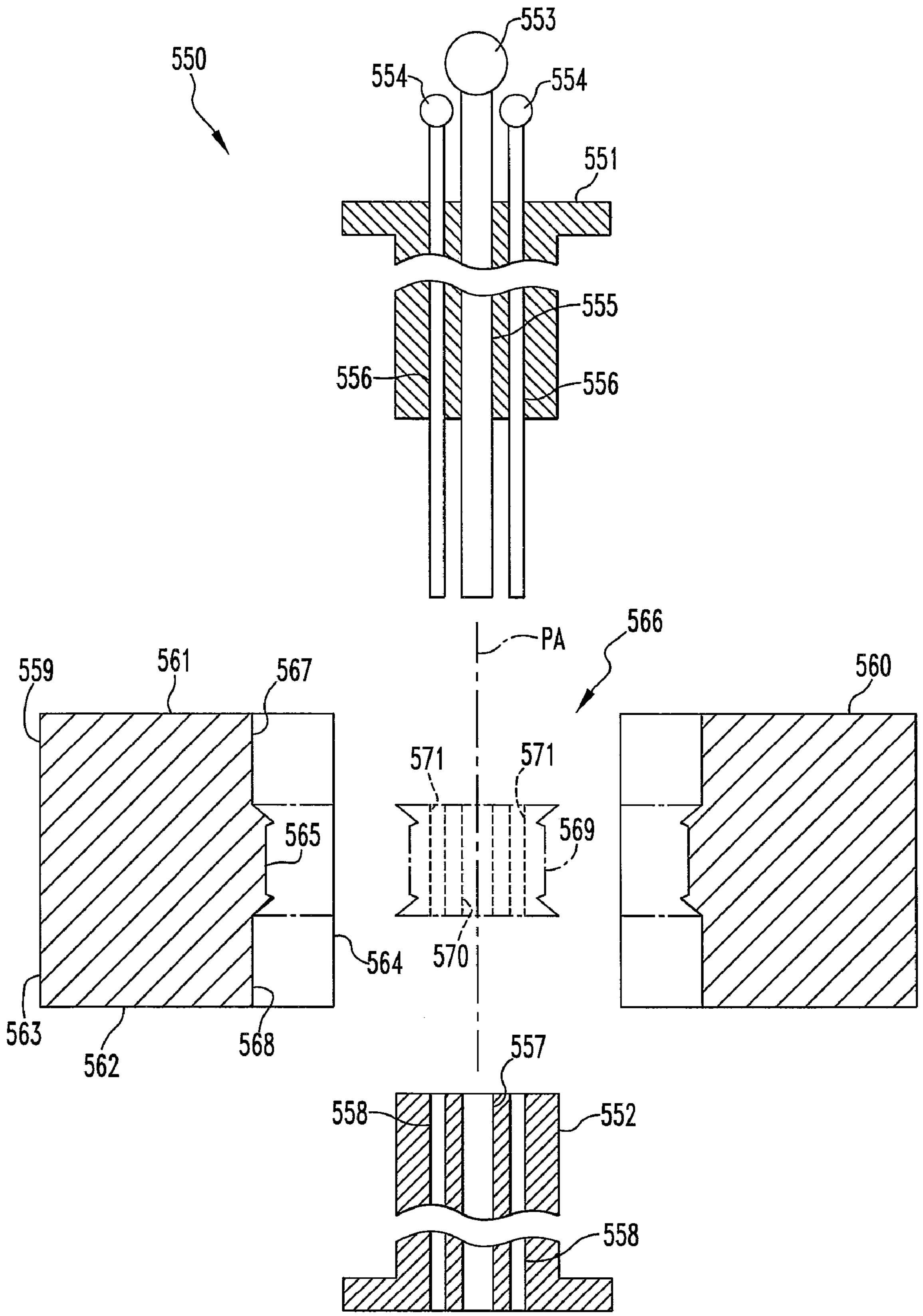
FIG. 11A is a schematic illustrating a split case die and top and bottom rams according to another embodiment of the present invention.
Figure 11B:
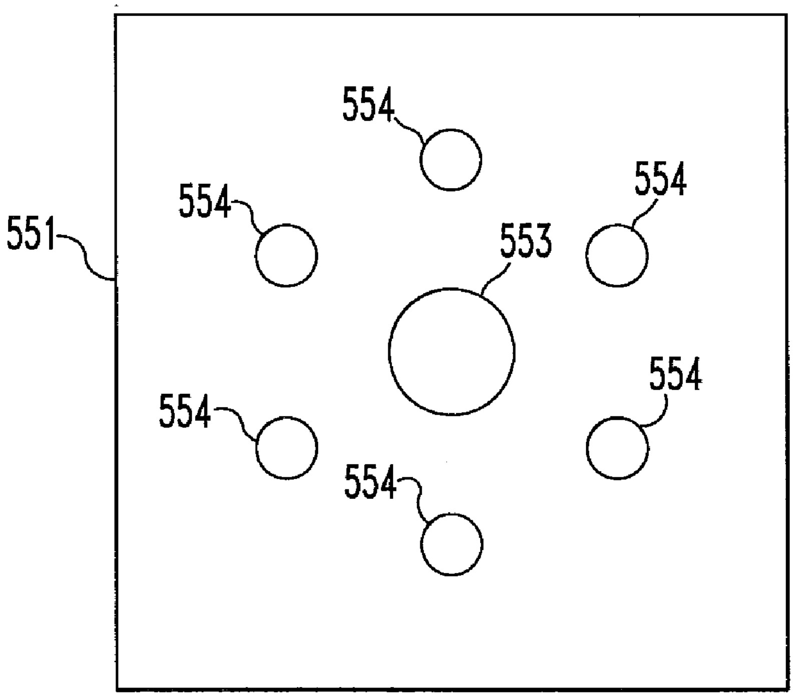
FIG. 11B is an end view of the top ram according to the embodiment shown in FIG. 11A.

In accordance with another embodiment of the present invention and with reference to FIGS. 11A and 11B, a uni-axial press 550 for forming a compressed part from powder according to another embodiment of the present invention is shown. The uni-axial press 550 includes a top ram 551 and a bottom ram 552, which are movable relative to one another along a pressing axis PA, and first 559 and second 560 die parts. Each of the first 559 and second 560 die parts includes a top surface 561 and a bottom surface 562, at least one peripheral surface 563, a parting surface 564 extending between the top 561 and bottom 562 surfaces of the die part 559, 560 in a direction non-perpendicular to the pressing axis PA, a die chamber portion 565 and top 567 and bottom 568 pressing bore portions extending between the die chamber portion 565 and the top 561 and bottom 562 surfaces, respectively.

As shown in FIG. 11A, the top 561 and bottom 562 surfaces of the first 559 and second 560 die parts at least partially define the top and bottom surfaces of the die. The peripheral surfaces 563 of the first 559 and second 560 die parts at least partially define the periphery of the die. The die parts 559 and 560 are mutually engageable along each of their adjacent parting surfaces 564. The die chamber portions 565 of the first 559 and second 560 die parts at least partially define a die chamber 566 extending along the pressing axis PA. The top 567 and bottom 568 pressing bore portions of the first 559 and second 560 die parts at least partially define the top and bottom pressing bores extending from the die chamber 566 to the top and bottom surfaces of the die, respectively.

The die parts 559, 560 are movable between separated (FIG. 11A) and engaged positions in a direction non-parallel to the pressing axis PA. The top 551 and bottom 552 rams are movable along the pressing axis PA through the top and bottom pressing bores, respectively, into the die chamber 566. At least one of, or alternatively both, of the top 551 and bottom 552 rams includes a respective shaped impression at an end thereof. The end of the top 551 and bottom 552 ram having the shaped impression is configured to be inserted into the die chamber 566 through a respective pressing bore. As shown in FIGS. 11A and 11B, the top and bottom rams 551, 552 each include a respective large central bore 555, 557, which slidably receive a large removable pin 553 that extends through the central bore 555 in the top ram 551 and into the central bore 557 in the bottom die part 552, or vice versa. The top and bottom rams 551, 552 also each include a respective plurality of small peripheral bores 556, 558. Corresponding smaller peripheral bores 556, 558 slidably receive a smaller removable pin 554 that extends through a smaller peripheral bore 556 in the top ram 551 and into a corresponding smaller peripheral bore 558 in the bottom die part 552, or vice versa. The pins 553, 554 extend between the top 551 and bottom 552 rams so that they effectively define the shaped impression of the rams 551, 552. In use, the top 551 and bottom 552 rams are disposed sufficiently proximate so that the pins 553, 554 extend from respective bores 555, 556 in the top ram 551 into corresponding respective bores 557, 558 in the bottom ram 552.

Figure 11C:
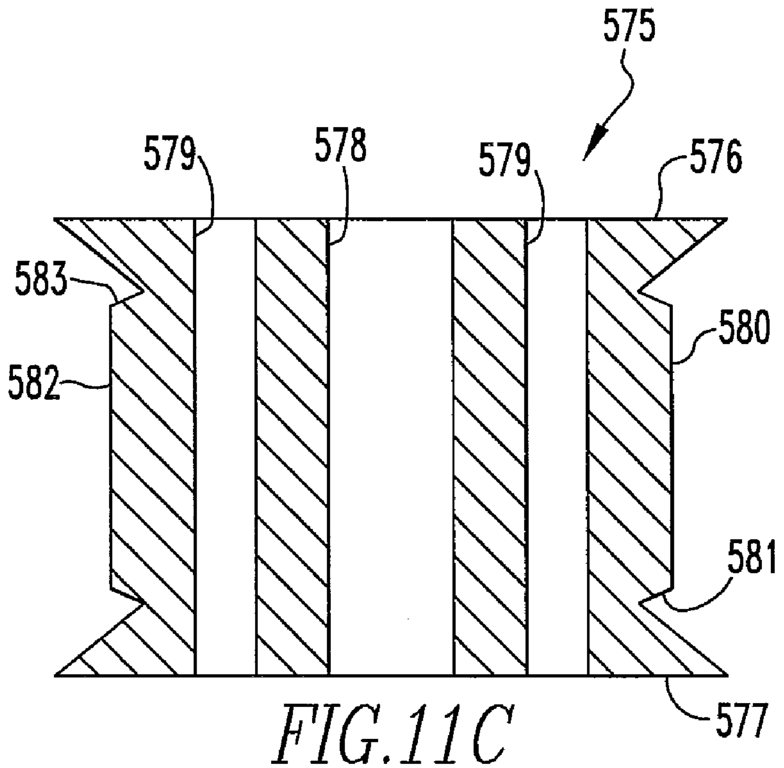
FIG. 11C is a cross-sectional side view of a green part formed by the split case die and top and bottom rams according to the embodiment shown in FIG. 11A.

Accordingly, as shown in FIG. 11A, the die chamber 564 defines an envelope 567, illustrated by the broken lines in the center of the die chamber 564, which corresponds to the shape of the green part in the compressed state. The large removable pin 553 passes through the die chamber 566 to define an envelope 570, which corresponds to the shape of a large central bore passing through the compressed green part from top to bottom thereof. The small removable pins 554 pass through the die chamber 566 to define a plurality of envelopes 571, which correspond to the shape of smaller peripheral bores passing through the compressed green part from top to bottom thereof. As shown in FIG. 11C, a green part 575 formed with the uni-axial press 550 includes a top surface 576 and a bottom surface 577. A central bore 578 formed by the central large removable pin 553 passes through the green part 575 from the top surface 576 to the bottom surface 577.

Additionally, a plurality of peripheral bores 579 formed by the smaller removable pins 554 pass through the green part 575 from the top surface 576 to the bottom surface 577. The green part 575 further includes a plurality of side surfaces 580, 582 that are imparted by the die chamber portions 565 of the die parts 559, 560 with certain respective surface features 581, 583, which may be chip control features in the sintered part that may assist with chip formation during a metal cutting operation. It is to be appreciated that the die parts 559, 560 may be configured to impart any type of surface features 581, 583 known to those having ordinary skill in the art.

It is to be appreciated that any one or more of the die parts 508, 509, 559, 560 discussed with reference to FIGS. 10A, 10B, 11A, and 11B may be provided with a passageway extending therethrough between the at least one peripheral surface of the die part and the die chamber portion non-parallel to the pressing axis PA as discussed above with reference to the embodiments illustrated in FIGS. 3A-3C, 4A-4C, 5A-5C, etc. The dies may additionally be provided with one or more removable core rods configured to be inserted into the die chamber through such passageways to define varying core bores and recesses within the compressed green part, as is also discussed above.

While several embodiments of a method and apparatus for cross-passageway pressing to produce cutting inserts were described in the foregoing detailed description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are embraced within their scope.

What is claimed is:

1. A die for use with a uni-axial press including top and bottom rams, at least one of the top and bottom rams being movable along a pressing axis, the die comprising:

at least two separable die parts, each having:

a top surface and a bottom surface, the top and bottom surfaces of the separable die parts collectively defining top and bottom surfaces of the die;

a peripheral surface, the peripheral surfaces of the separable die parts collectively defining a periphery of the die;

parting surfaces extending between the top and bottom surfaces of the die part;

a die chamber portion, wherein the die chamber portions of the separable die parts collectively define a die chamber extending along the pressing axis, wherein the die chamber has chamber walls that define a volume having a shape that captures a formed part so that it is immovable within the assembled die; and top and bottom pressing bore portions extending between the die chamber portion and the top and bottom surfaces, respectively, the top and bottom pressing bore portions of the separable die parts collectively defining top and bottom pressing bores extending from the die chamber to the top and bottom surfaces of the die, respectively; and a first removable core rod;

wherein the die parts are movable between separated and engaged positions in a direction non-parallel to the pressing axis, the die includes a first passageway extending therethrough between the periphery of the die and the die chamber, and the first removable core rod is configured to be inserted into the die chamber through the first passageway;

wherein the parting surfaces of each die part are adjacent to the die chamber portion and, in the assembled die, contact adjacent parting surfaces of other die chamber portion(s); and wherein each parting surface extends in a direction non-perpendicular to the pressing axis.

2. The die according to claim 1, wherein the at least two separable die parts comprise four separable die parts.

3. The die according to claim 1, wherein the first passageway extends through a first die part between the at least one peripheral surface and the die chamber portion of the first die part non-parallel to the pressing axis.

4. The die according to claim 1, further comprising a second removable core rod, wherein a second die part has a second passageway extending therethrough between the peripheral surface and the die chamber portion of the second die part, and the second removable core rod is configured to be inserted into the die chamber through the second passageway.

5. The die according to claim 4, wherein the first and second removable core rods engage each other within the die chamber.

6. The die according to claim 4, wherein the first and second passageways extend parallel to each other.

7. The die according to claim 6, wherein the first and second passageways extend parallel to the direction of movement of the first and second die parts between the separated and engaged positions.

8. The die according to claim 3, wherein the first removable core rod is a core wire having a centerline extending along a curved path.

9. The die according to claim 8, wherein a second die part has a second passageway extending therethrough between the peripheral surface and the die chamber portion of the second die part and the core wire is configured to be inserted into the die chamber through the first and second passageways.

10. The die according to claim 9, wherein the second passageway extends non-parallel to the first passageway.

11. The die according to claim 9, wherein the curved path of the centerline of the core wire is helical.

12. The die according to claim 1, wherein the first removable core rod includes a shaped impression at an end thereof, and the end having the shaped impression is configured to be inserted into the die chamber through the passageway.

13. The die according to claim 12, wherein the shaped impression includes a plurality of stepped protrusions.

14. The die according to claim 12, wherein the shaped impression includes a plurality of stepped recesses.

15. The die according to claim 12, wherein the shaped impression includes external threading surrounding the end of the core rod.

16. The die according to claim 12, wherein the end of the first removable core rod having the shaped impression is configured to be inserted into the die chamber a distance no greater than a distance between the die cavity portion of the first die part and the pressing axis.

17. The die according to claim 1, wherein the die chamber includes a spiral flute portion co-axial with the pressing axis.

18. A uni-axial press for forming a compressed part from powder, comprising:

a top ram and a bottom ram movable relative to one another along a pressing axis; and at least two separable die parts, each having:

a top surface and a bottom surface, the top and bottom surfaces of the separable die parts collectively defining top and bottom surfaces of the die;

a peripheral surface, the peripheral surfaces of the separable die parts at collectively defining a periphery of the die;

parting surfaces extending between the top and bottom surfaces of the die part;

a die chamber portion, wherein the die chamber portions of the separable die parts collectively define a die chamber extending along the pressing axis; wherein the die chamber has chamber walls that define a volume having a shape that captures a formed part so that it is immovable within the assembled die; and top and bottom pressing bore portions extending between the die chamber portion and the top and bottom surfaces, respectively, the top and bottom pressing bore portions of the separable die parts collectively defining top and bottom pressing bores extending from the die chamber to the top and bottom surfaces of the die, respectively, wherein the die parts are movable between separated and engaged positions in a direction non-parallel to the pressing axis and the top and bottom rams are movable through the top and bottom pressing bores, respectively, into the die chamber; and wherein at least one of the top and bottom rams includes a shaped impression at an end thereof and the end having the shaped impression is configured to be inserted into the die chamber through the respective pressing bore;

wherein the parting surfaces of each die part are adjacent to the die chamber portion and, in the assembled die, contact adjacent parting surfaces of other die chamber portion(s); and wherein each parting surface extends in a direction non-perpendicular to the pressing axis.

19. The uni-axial press according to claim 18, wherein the at least two separable die parts comprise four separable die parts.

20. The uni-axial press according to claim 18, further comprising a first removable core rod, wherein the die includes a first passageway extending therethrough between the periphery of the die and the die chamber and the first removable core rod is configured to be inserted into the die chamber through the first passageway.

21. The uni-axial press according to claim 20, wherein the first passageway extends through a first die part between the at least one peripheral surface and the die chamber portion of the first die part non-parallel to the pressing axis.

22. The uni-axial press according to claim 20, further comprising a second removable core rod, wherein the die further includes a second passageway extending therethrough between the periphery of the die and the die chamber, and the second removable core rod is configured to be inserted into the die chamber through the second passageway.

23. The uni-axial press according to claim 22, wherein the first and second removable core rods engage each other within the die chamber.

24. The uni-axial press according to claim 22, wherein the first and second passageways extend parallel to each other.

25. The uni-axial press according to claim 18, wherein the shaped impression includes stepped protrusions formed on both the top and bottom rams and a removable pin slidably received within bores extending through the top and bottom rams.

26. The uni-axial press according to claim 18, wherein the shaped impression includes a large central pin and a plurality of smaller peripheral pins slidably received within bores extending through the top and bottom rams.

* * * * *

UNITED STATES PATENT AND TRADEMARK OFFICE

CERTIFICATE OF CORRECTION

PATENT NO. : 8,033,805 B2
APPLICATION NO. : 12/638033
DATED : October 11, 2011
INVENTOR(S) : Richard J. Gubanich et al.

It is certified that error appears in the above-identified patent and that said Letters Patent is hereby corrected as shown below:

IN THE CLAIMS

1. In Column 18, Line 26, in Claim 18, delete “respectively,” and insert -- respectively; --, therefor.

2. In Column 18, Line 31, in Claim 18, delete “chamber; and” and insert -- chamber; --, therefor.

Signed and Sealed this
Ninth Day of April, 2013

Teresa Stanek Rea
*Acting Director of the United States Patent and Trademark Office*